US012456840B2

(12) United States Patent
Lin et al.

(10) Patent No.: US 12,456,840 B2
(45) Date of Patent: Oct. 28, 2025

(54) ELECTRICAL CONNECTOR AND ASSEMBLY THEREOF WITH HYBRID CONNECTION FOR CONDUCTIVE TERMINALS

(71) Applicant: DONGGUAN LUXSHARE TECHNOLOGIES CO., LTD, Dongguan (CN)

(72) Inventors: Yanbo Lin, Dongguan (CN); Kunlin Yao, Dongguan (CN); Rongzhe Guo, Dongguan (CN); Tao Song, Dongguan (CN); Shangfeng Zhu, Dongguan (CN)

(73) Assignee: DONGGUAN LUXSHARE TECHNOLOGIES CO., LTD, Dongguan (CN)

( * ) Notice: Subject to any disclaimer, the term of this patent is extended or adjusted under 35 U.S.C. 154(b) by 363 days.

(21) Appl. No.: 18/078,327

(22) Filed: Dec. 9, 2022

(65) Prior Publication Data

US 2023/0187862 A1 Jun. 15, 2023

(30) Foreign Application Priority Data

Dec. 14, 2021 (CN) ......................... 202111524642.8
Aug. 25, 2022 (CN) ......................... 202211025117.6

(51) Int. Cl.
*H01R 13/627* (2006.01)
*H01R 12/51* (2011.01)
(Continued)

(52) U.S. Cl.
CPC ....... *H01R 13/6273* (2013.01); *H01R 12/515* (2013.01); *H01R 12/722* (2013.01);
(Continued)

(58) Field of Classification Search
CPC .. H01R 13/6273; H01R 13/11; H01R 13/502; H01R 13/648; H01R 13/66; H01R 12/515; H01R 12/722; H01R 31/06
(Continued)

(56) References Cited

U.S. PATENT DOCUMENTS 4,647,123 A * 3/1987 Chin ..................... G06F 13/409 711/E12.088
8,308,491 B2 * 11/2012 Nichols .................. H01R 12/73 439/67
(Continued)

FOREIGN PATENT DOCUMENTS

CN 1707869 A 12/2005
CN 106340762 A 1/2017
(Continued)

*Primary Examiner* — Gary F Paumen
(74) *Attorney, Agent, or Firm* — Birch, Stewart, Kolasch & Birch, LLP

(57) ABSTRACT

An electrical connector includes an insulating body, a number of conductive terminals, an adapter circuit board and a number of cables. The insulating body includes a mating surface and a receiving slot. Each conductive terminal includes a mating portion protruding into the receiving slot and a tail portion. The conductive terminals includes a number of first signal terminals and a number of second signal terminals. Each tail portion of the first signal terminals includes a connection portion. The adapter circuit board includes a first insertion portion and a second insertion portion. The first insertion portion includes a number of first mating conductive pads in contact with the tail portions of the second signal terminals. The second insertion portion includes a number of second mating conductive pads for mating with a mating electrical connector. A connector assembly having the electrical connector is also disclosed.

19 Claims, 31 Drawing Sheets

(51) Int. Cl.
*H01R 12/72* (2011.01)
*H01R 13/11* (2006.01)
*H01R 13/502* (2006.01)
*H01R 13/648* (2006.01)
*H01R 13/66* (2006.01)
*H01R 31/06* (2006.01)

(52) U.S. Cl.
CPC ........... *H01R 13/11* (2013.01); *H01R 13/502* (2013.01); *H01R 13/648* (2013.01); *H01R 13/66* (2013.01); *H01R 31/06* (2013.01)

(58) Field of Classification Search
USPC .................................... 439/61, 76.1, 67, 329
See application file for complete search history.

(56) References Cited

U.S. PATENT DOCUMENTS

| | | | | |
|---|---|---|---|---|
| 2002/0160658 | A1* | 10/2002 | Sipe | H01R 13/6658 439/61 |
| 2004/0192077 | A1* | 9/2004 | Akamatsu | H05K 7/1439 439/61 |
| 2010/0093192 | A1* | 4/2010 | Lin | H01R 12/62 439/67 |
| 2011/0028017 | A1* | 2/2011 | Chuo | H05K 1/117 439/329 |
| 2020/0203881 | A1 | 6/2020 | Marzano et al. | |

FOREIGN PATENT DOCUMENTS

| | | | |
|---|---|---|---|
| CN | 206225604 | U | 6/2017 |
| CN | 112072409 | A | 12/2020 |
| CN | 112514175 | A | 3/2021 |
| CN | 112636100 | A | 4/2021 |
| CN | 113078510 | A | 7/2021 |
| CN | 113078527 | A | 7/2021 |
| CN | 214204164 | U | 9/2021 |
| EP | 0 971 451 | B1 | 5/2006 |
| TW | I506865 | B | 11/2015 |

* cited by examiner

ELECTRICAL CONNECTOR AND ASSEMBLY THEREOF WITH HYBRID CONNECTION FOR CONDUCTIVE TERMINALS

CROSS-REFERENCE TO RELATED APPLICATIONS

This patent application claims priority of a Chinese Patent Application No. 202111524642.8, filed on Dec. 14, 2021 and titled "ELECTRICAL CONNECTOR", and a Chinese Patent Application No. 202211025117.6, filed on Aug. 25, 2022 and titled "ELECTRICAL CONNECTOR AND ASSEMBLY THEREOF", the content of which is incorporated herein by reference in its entirety.

TECHNICAL FIELD

The present disclosure relates to an electrical connector and a connector assembly thereof, which belongs to a technical field of connectors.

BACKGROUND

With the continuous development of electrical connectors, the conductive terminals of the electrical connectors have more and more appearances. Some of the conductive terminals are used to transmit high-speed signals, and these conductive terminals are called high-speed signal terminals. Some conductive terminals are used to transmit non-high-speed signals, and these conductive terminals are called non-high-speed signal terminals.

In the related art, it is generally not distinguished whether the conductive terminals are high-speed signal terminals or non-high-speed signal terminals, and cable connection or circuit board connection is used uniformly. However, this approach still has room for improvement.

SUMMARY

An object of the present disclosure is to provide an electrical connector and a connector assembly thereof with a hybrid connection for conductive terminals.

In order to achieve the above object, the present disclosure adopts the following technical solution: an electrical connector, including: an insulating body including a mating surface and a receiving slot extending through the mating surface; a plurality of conductive terminals, each conductive terminal including a mating portion protruding into the receiving slot and a tail portion opposite to the mating portion, the plurality of conductive terminals including a plurality of first signal terminals and a plurality of second signal terminals, each tail portion of the first signal terminals including a connection portion; an adapter circuit board including a first insertion portion and a second insertion portion, the first insertion portion including a plurality of first mating conductive pads, the plurality of first mating conductive pads being in contact with the tail portions of the plurality of second signal terminals, the second insertion portion including a plurality of second mating conductive pads, the plurality of second mating conductive pads being configured to mate with a mating electrical connector; and a plurality of cables which are in contact with the connection portions of the first signal terminals.

In order to achieve the above object, the present disclosure adopts the following technical solution: a connector assembly, including: an electrical connector and a mating electrical connector which are mated with each other, the electrical connector including: an insulating body including a mating surface and a receiving slot extending through the mating surface; a plurality of conductive terminals, each conductive terminal including a mating portion protruding into the receiving slot and a tail portion opposite to the mating portion, the plurality of conductive terminals including a plurality of first signal terminals and a plurality of second signal terminals, each tail portion of the first signal terminals including a connection portion; an adapter circuit board including a first insertion portion and a second insertion portion, the first insertion portion including a plurality of first mating conductive pads, the plurality of first mating conductive pads being in contact with the tail portions of the plurality of second signal terminals, the second insertion portion including a plurality of second mating conductive pads, the plurality of second mating conductive pads being configured to mate with the mating electrical connector; and a plurality of cables which are in contact with the connection portions of the first signal terminals; the mating electrical connector including: a mating insulating body including a mating surface and a mating slot extending through the mating surface, the adapter circuit board being at least partially inserted into the mating slot; and a plurality of mating conductive terminals, each mating conductive terminal including a contact portion extending into the mating slot, the contact portions of the plurality of mating conductive terminals being in electrical contact with the adapter circuit board; wherein the electrical connector and the mating electrical connector further include interlocking structures to prevent the electrical connector from being detached from the mating electrical connector.

Compared with the prior art, the first/high-speed signal terminals of the present disclosure are connected to the cables, and are transmitted through the cables, which reduces distortion and improves the quality of signal transmission. At the same time, the second/non-high-speed signal terminals are electrically connected to the adapter circuit board, which simplifies a circuit design of the adapter circuit board. The conductive terminals of the electrical connector of the present disclosure are connected by the cables and the adapter circuit board in a hybrid manner, which can not only adapt to the transmission of high-speed signal terminals and non-high-speed signal terminals, but also balance the design of the electrical connector and save costs.

DETAILED DESCRIPTION

Figure 1:
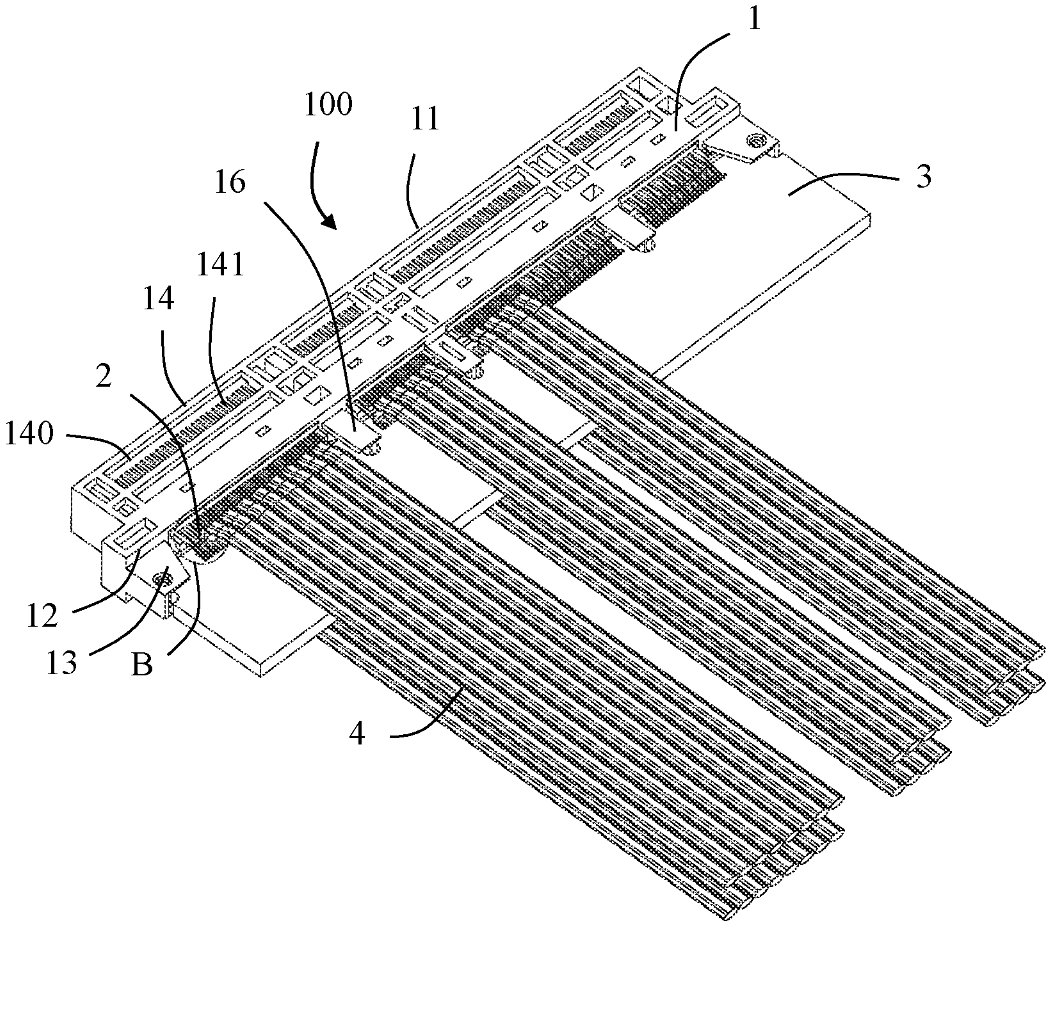
FIG. 1 is a perspective schematic view of an electrical connector in accordance with a first embodiment of the present disclosure.
Figure 2:
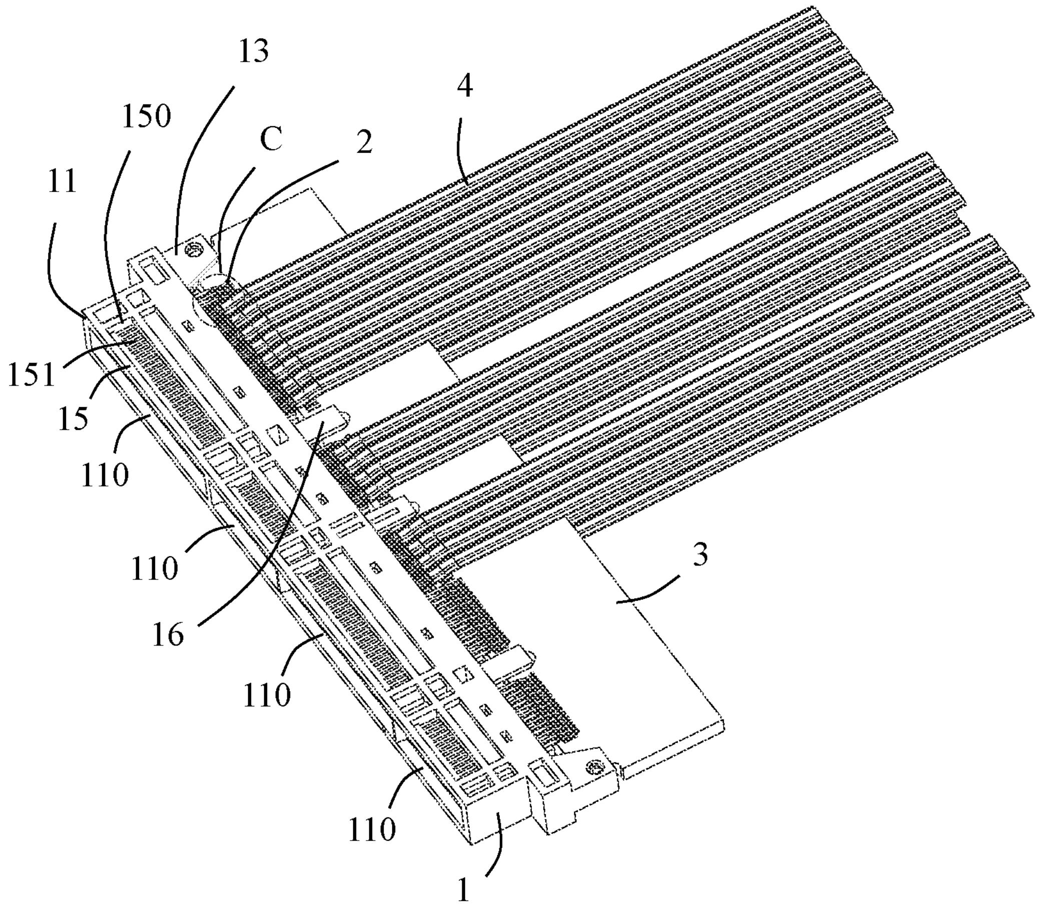
FIG. 2 is a perspective schematic view of FIG. 1 from another angle.

Exemplary embodiments will be described in detail here, examples of which are shown in drawings. When referring to the drawings below, unless otherwise indicated, same numerals in different drawings represent the same or similar elements. The examples described in the following exemplary embodiments do not represent all embodiments consistent with this application. Rather, they are merely examples of devices and methods consistent with some aspects of the application as detailed in the appended claims.

The terminology used in this application is only for the purpose of describing particular embodiments, and is not intended to limit this application. The singular forms “a”, “said”, and “the” used in this application and the appended claims are also intended to include plural forms unless the context clearly indicates other meanings.

It should be understood that the terms “first”, “second” and similar words used in the specification and claims of this application do not represent any order, quantity or importance, but are only used to distinguish different components. Similarly, “an” or “a” and other similar words do not mean a quantity limit, but mean that there is at least one; “multiple” or “a plurality of” means two or more than two. Unless otherwise noted, “front”, “rear”, “lower” and/or “upper” and similar words are for ease of description only and are not limited to one location or one spatial orientation. Similar words such as “include” or “comprise” mean that elements or objects appear before “include” or “comprise” cover elements or objects listed after “include” or “comprise” and their equivalents, and do not exclude other elements or objects. The term “a plurality of” mentioned in the present disclosure includes two or more.

Hereinafter, some embodiments of the present disclosure will be described in detail with reference to the accompanying drawings. In the case of no conflict, the following embodiments and features in the embodiments can be combined with each other.

Referring to FIGS. 1 to 18, a first embodiment of the present disclosure discloses an electrical connector 100 including an insulating body 1, a plurality of conductive terminals 2, an adapter circuit board 3, and a plurality of cables 4. The electrical connector 100 is used for mating with a mating element (not shown) to transmit data and connect to a power source etc.

Referring to FIGS. 1, 2, 5, 9 and 10, in the illustrated embodiment of the present disclosure, the insulating body 1 includes a mating surface 11, a rear end face 12 opposite to the mating face 11, a receiving slot 110 extending forwardly through the mating surface 11, and an extension portion 13 extending backwardly beyond the rear end surface 12. In the illustrated embodiment of the present disclosure, the mating surface 11 is a front end surface. A plurality of the receiving slots 110 are provided and arranged at intervals along a length direction L-L (for example, a left-right direction) of the electrical connector 100. In the illustrated embodiment of the present disclosure, sizes of two adjacent receiving slots 110 along the length direction L-L of the electrical connector 100 are different. The receiving slots 110 are used for receiving the mating element (e.g., an electronic card or a tongue plate of a mating connector).

Since the structure of the electrical connector 100 corresponding to each receiving slot 110 is similar, only one of the receiving slots 110 will be described below as an example.

The insulating body 1 includes a top wall 14 and a bottom wall 15. The receiving slot 110 is located between the top wall 14 and the bottom wall 15. The top wall 14 includes a first hollow groove 140 and a plurality of first spacing grooves 141 connected to the first hollow groove 140. The bottom wall 15 includes a second hollow groove 150 and a plurality of second spacing grooves 151 connected to the second hollow groove 150.

Figure 9:
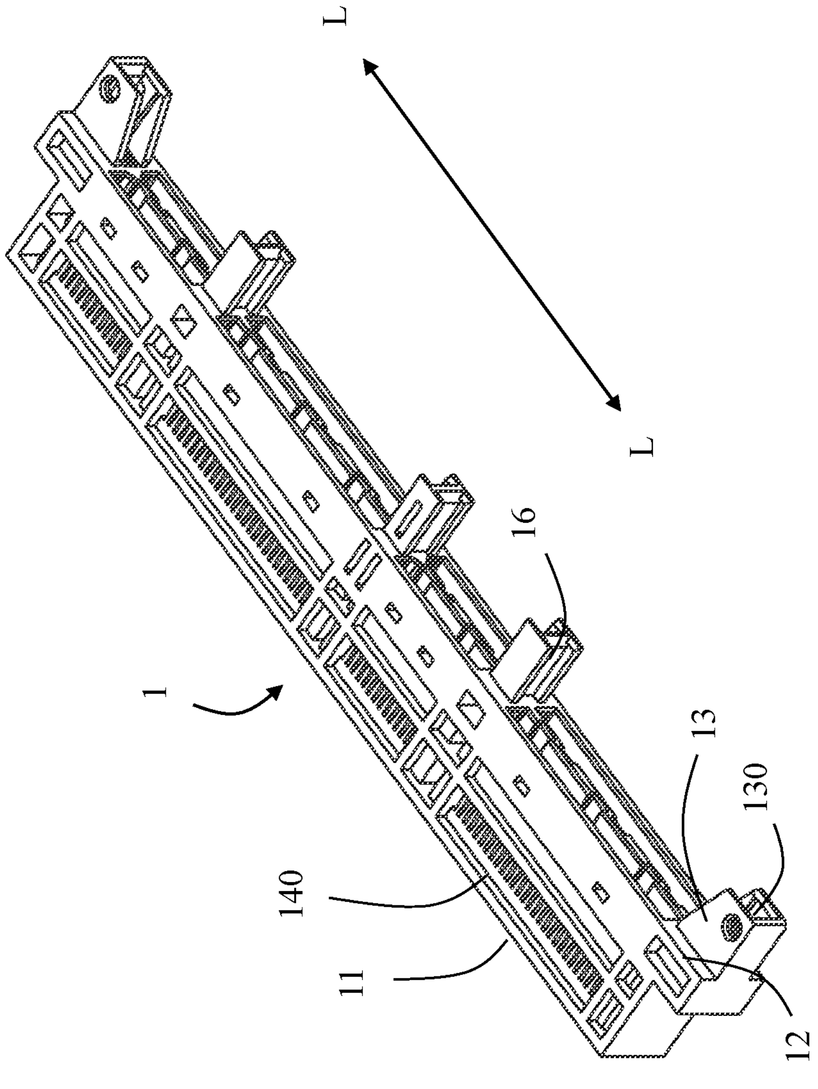
FIG. 9 is a perspective schematic view of an insulating body in FIG. 1.
Figure 10:
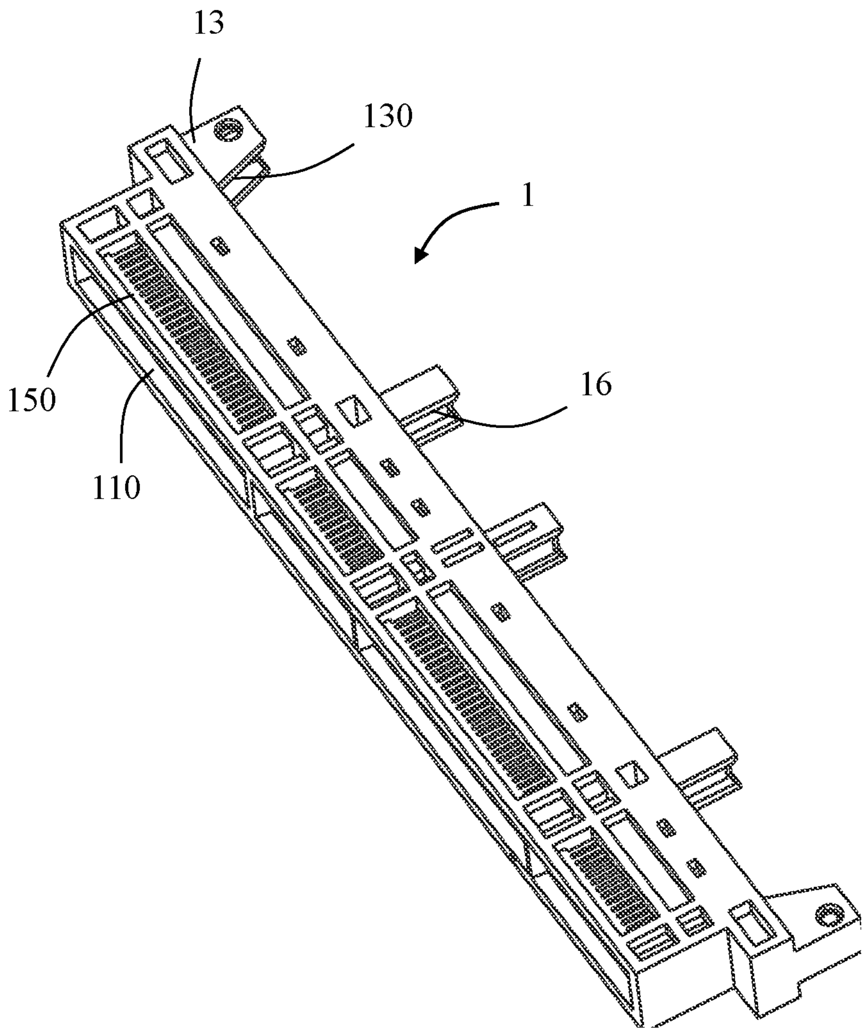
FIG. 10 is a perspective schematic view of FIG. 9 from another angle.

Referring to FIGS. 9 and 10, the extension portion 13 is provided with a positioning groove 130 for at least partially receiving the adapter circuit board 3. In addition, referring to FIGS. 6 and 7, in order to better position and fix the adapter circuit board 3, the extension portion 13 is provided with a first rib 131 protruding upwardly into the positioning groove 130 and a second rib 132 protruding downwardly into the positioning groove 130. The first rib 131 and the second rib 132 abut against opposite surfaces of the adapter circuit board 3, respectively.

Figure 3:
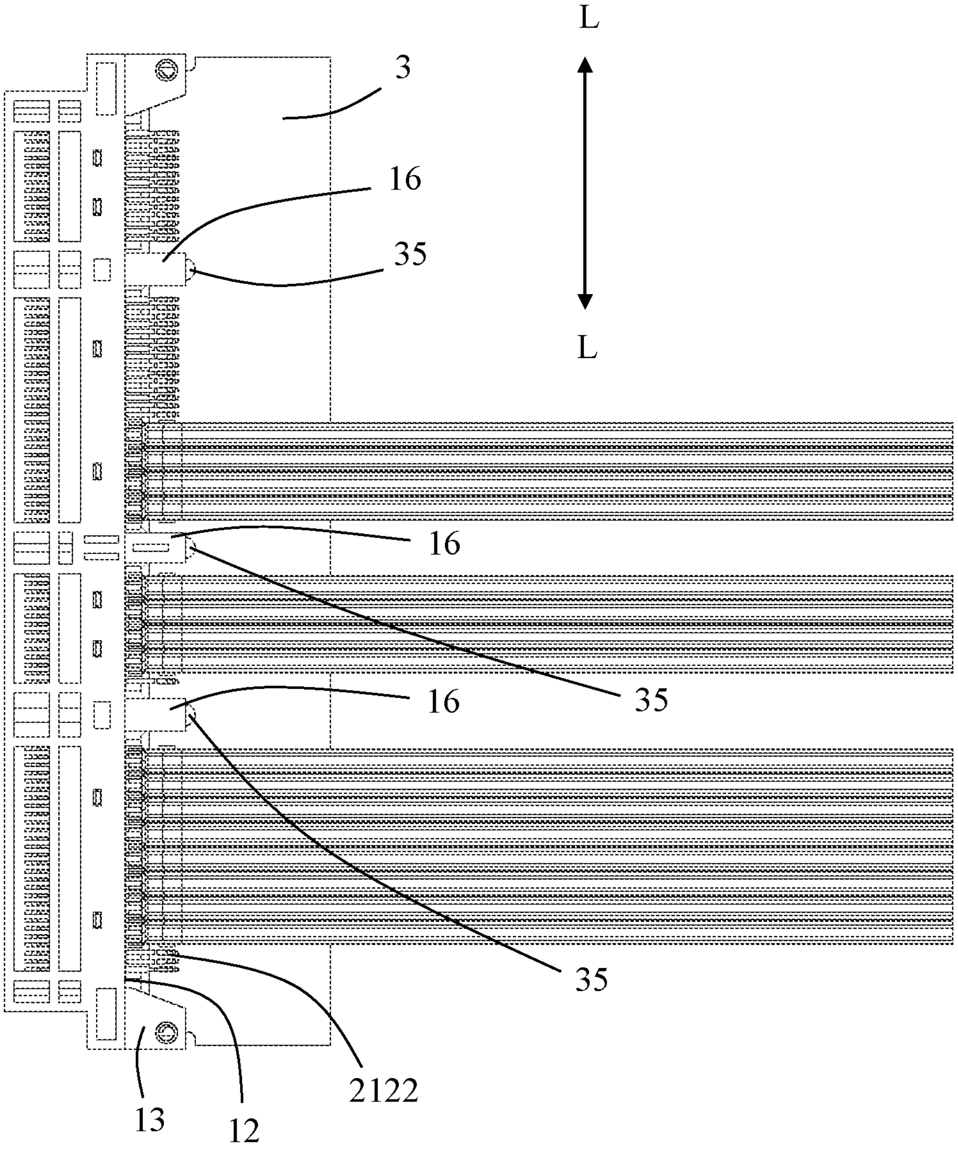
FIG. 3 is a top view of FIG. 1.
Figure 4:
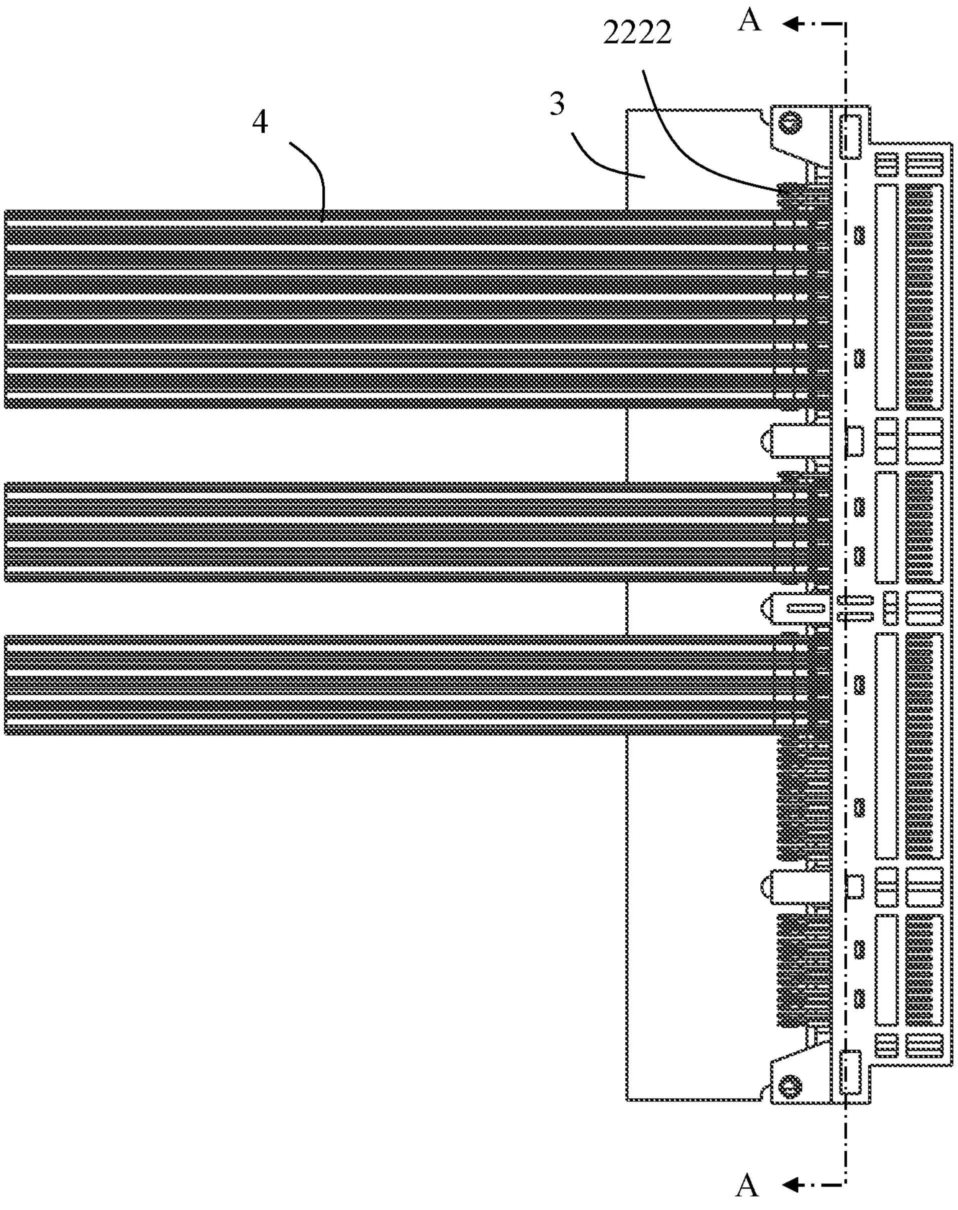
FIG. 4 is a bottom view of FIG. 3.
Figure 5:
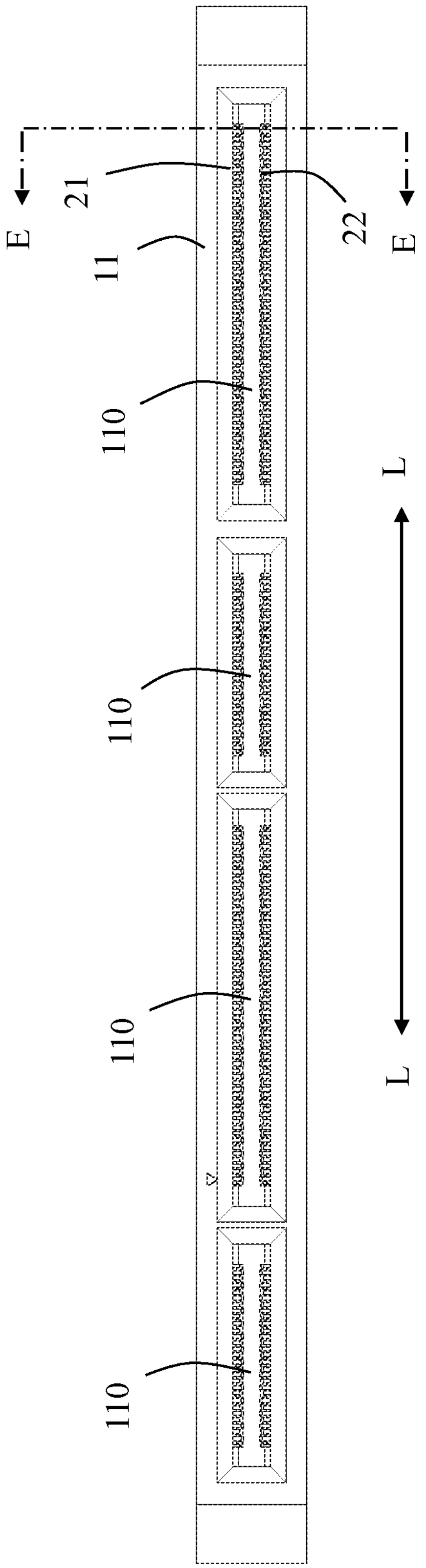
FIG. 5 is a front view of FIG. 1.
Figure 6:
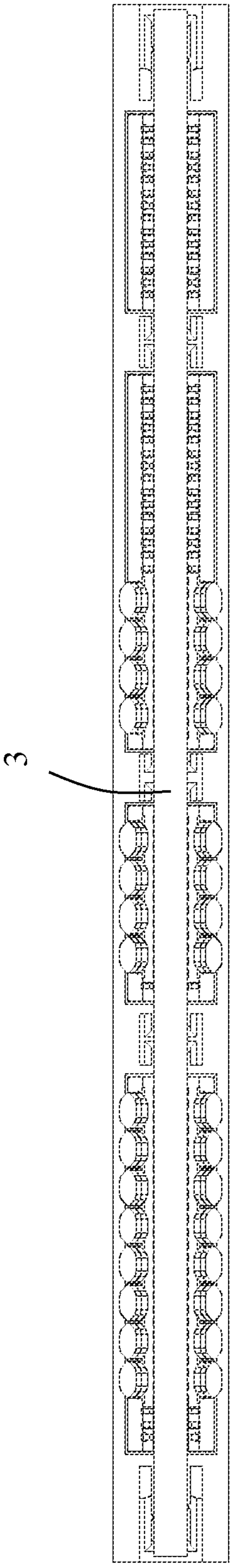
FIG. 6 is a rear view of FIG. 1.
Figure 7:
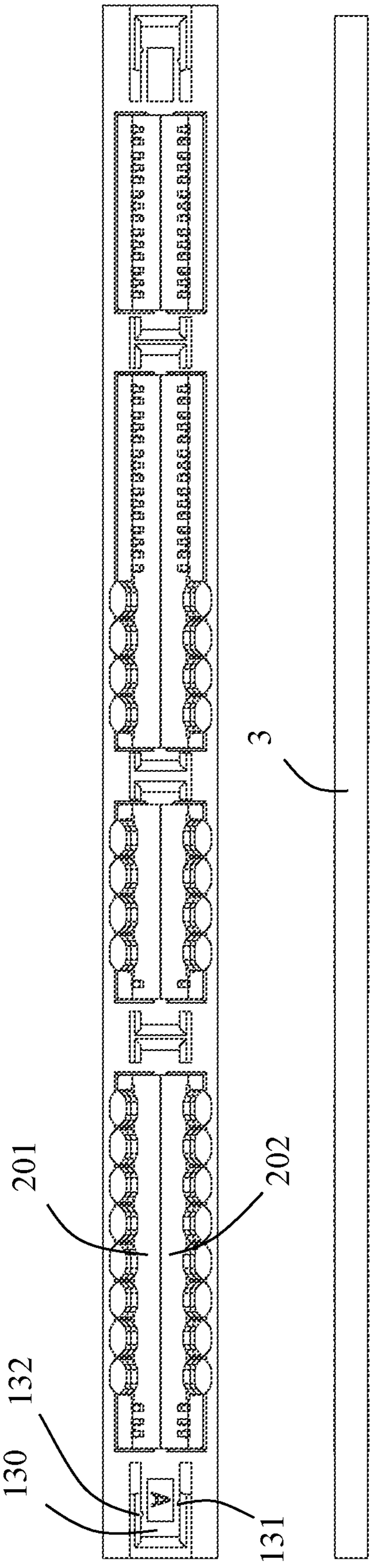
FIG. 7 is a partial exploded schematic view of FIG. 6.
Figure 8:
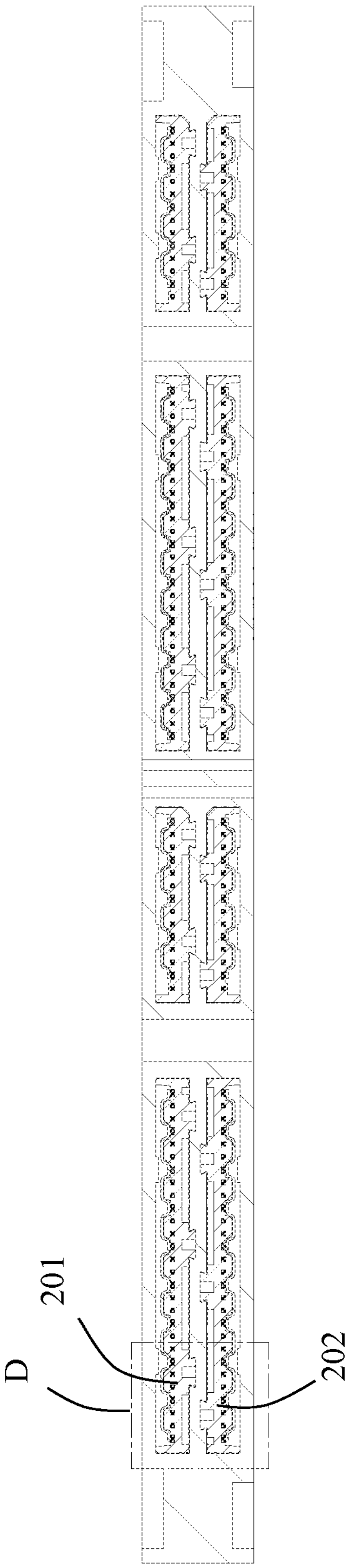
FIG. 8 is a schematic cross-sectional view taken along line A-A in FIG. 4.

Referring to FIG. 3, the insulating body 1 further includes a partition 16 located between two adjacent receiving slots 110 along the length direction L-L. The partition 16 protrudes backwardly beyond the rear end surface 12 to be matched with the adapter circuit board 3.

Referring to FIG. 5 and FIGS. 11 to 18, the plurality of conductive terminals 2 include a plurality of first conductive terminals 21 and a plurality of second conductive terminals 22. The plurality of first conductive terminals 21 are arranged in a row (for example, an upper row). The plurality of second conductive terminals 22 are arranged in another row (for example, a lower row).

In the illustrated embodiment of the present disclosure, the electrical connector 100 includes a first terminal module 201 and a second terminal module 202. The first terminal module 201 and the second terminal module 202 are assembled to the insulating body 1. The first terminal module 201 includes a first insulating block 23. The plurality of first conductive terminals 21 are insert-molded with the first insulating block 23. The second terminal module 202 includes a second insulating block 24. The plurality of second conductive terminals 22 are insert-molded with the second insulating block 24. Of course, in other embodiments, the first conductive terminals 21 and the second conductive terminals 22 may also be directly assembled to the insulating body 1.

Figure 13:
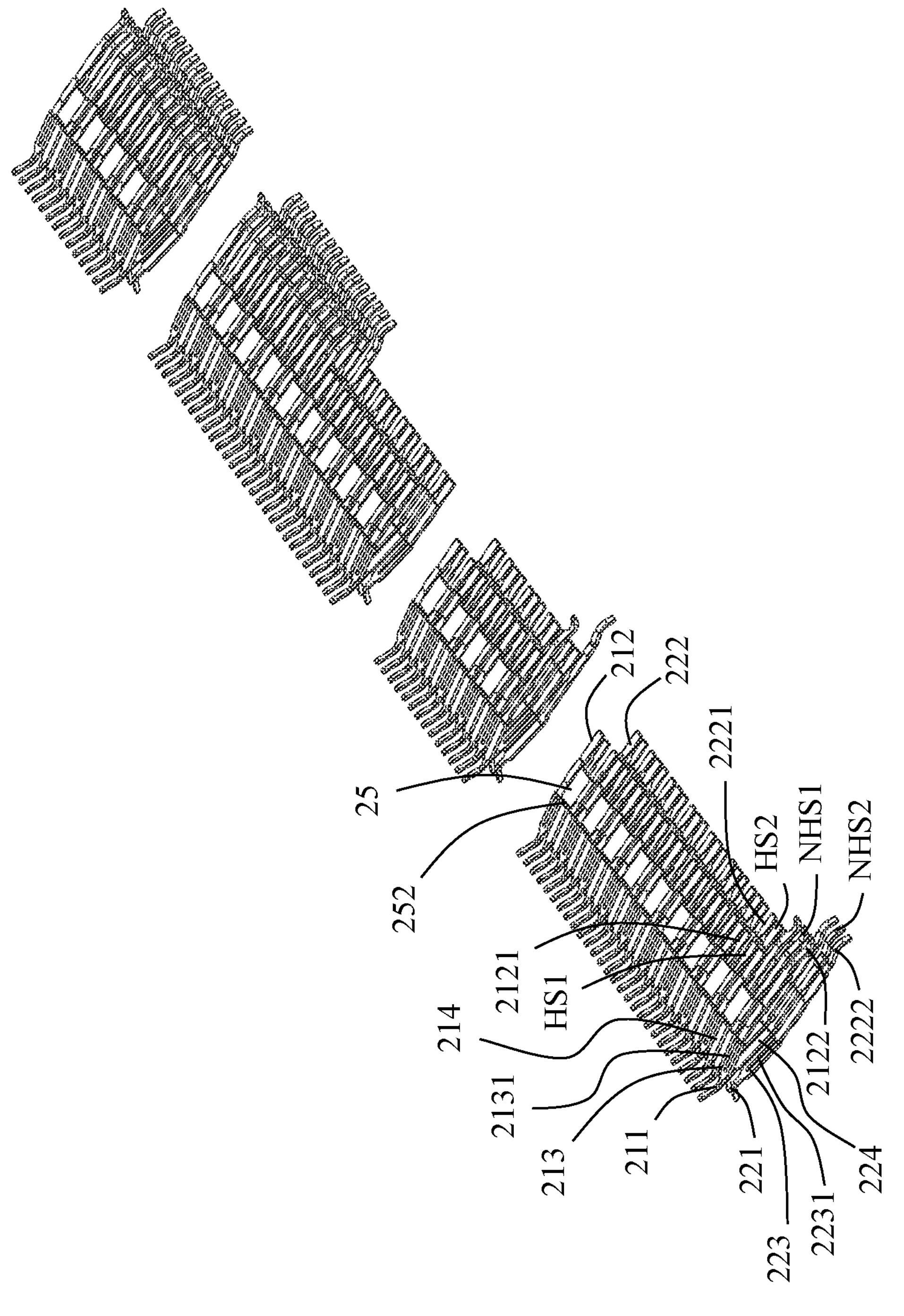
FIG. 13 is a perspective schematic view of conductive terminals in FIG. 11.
Figure 14:
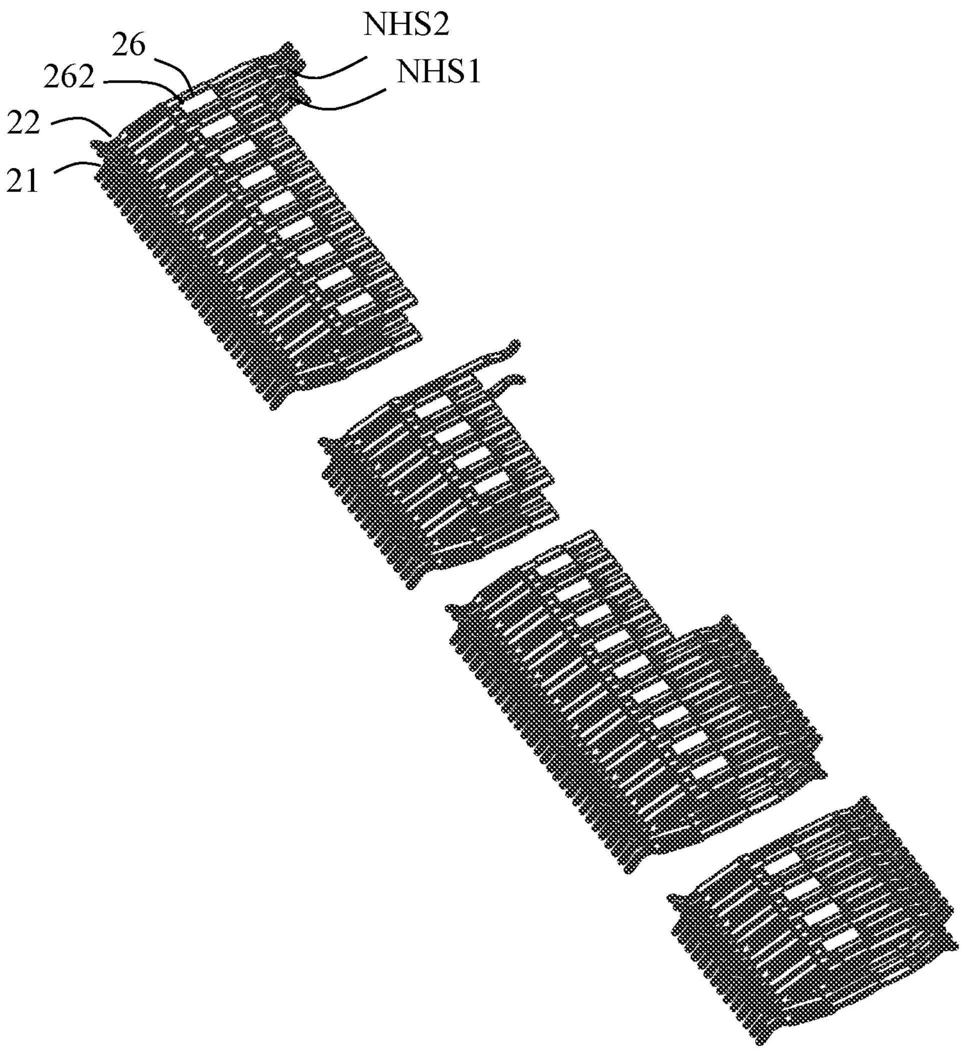
FIG. 14 is a perspective schematic view of FIG. 13 from another angle.
Figure 18:
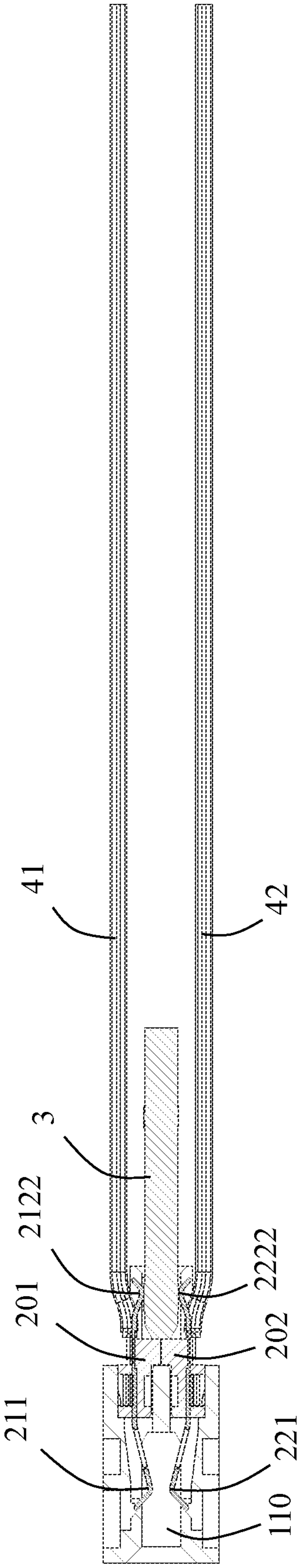
FIG. 18 is a schematic cross-sectional view taken along line E-E in FIG. 5.

Referring to FIGS. 13 and 18, each first conductive terminal 21 includes a first mating portion 211 protruding into the receiving slot 110 and a first tail portion 212 opposite to the first mating portion 211. The plurality of first conductive terminals 21 include a plurality of first high-speed signal terminals (High speed Signal, HS1) and a plurality of first non-high-speed signal terminals (Non-High speed Signal, NHS1). The first tail portion 212 of the first high-speed signal terminal HS1 includes a first connecting portion 2121. The first tail portion 212 of the first non-high-speed signal terminal NHS1 includes a first elastic mounting arm 2122. In an embodiment of the present disclosure, the first high-speed signal terminals HS1 are differential pair signal terminals. The first non-high-speed signal terminals NHS1 are single signal terminals.

Each second conductive terminal 22 includes a second mating portion 221 protruding into the receiving slot 110, and a second tail portion 222 opposite to the second mating portion 221. The plurality of second conductive terminals 22 include a plurality of second high-speed signal terminals (High speed Signal, HS2) and a plurality of second non-high-speed signal terminals (Non-High speed Signal, NHS2). The second tail portion 222 of the second high-speed-signal terminal HS2 includes a second connecting portion 2221. The second tail portion 222 of the second non-high-speed signal terminal NHS2 includes a second elastic mounting arm 2222. In an embodiment of the present disclosure, the second high-speed signal terminals HS2 are differential pair signal terminals. The second non-high-speed signal terminals NHS2 are single signal terminals. The first connecting portion 2121 has a shape of a flat plate. The first elastic mounting arm 2122 extends beyond the first connecting portion 2121 in a direction (for example, a front-to-back direction) away from the first mating portion 211. The second connecting portion 2221 has a shape of a flat plate. The second elastic mounting arm 2222 extends beyond the second connecting portion 2221 in a direction (for example, the front-to-back direction) away from the second mating portion 221. In the embodiment shown in the present disclosure, the first mating portions 211 and the second mating portions 221 are elastic mating portions, so as to improve the mating reliability when mating with the mating element.

In the illustrated embodiment of the present disclosure, the first mating portions 211 have same structures, and the second mating portions 221 also have same structures. The first mating portions 211 and the second mating portions 221 are symmetrically disposed on opposite sides (for example, upper and lower sides) of the receiving slot 110.

Figure 17:
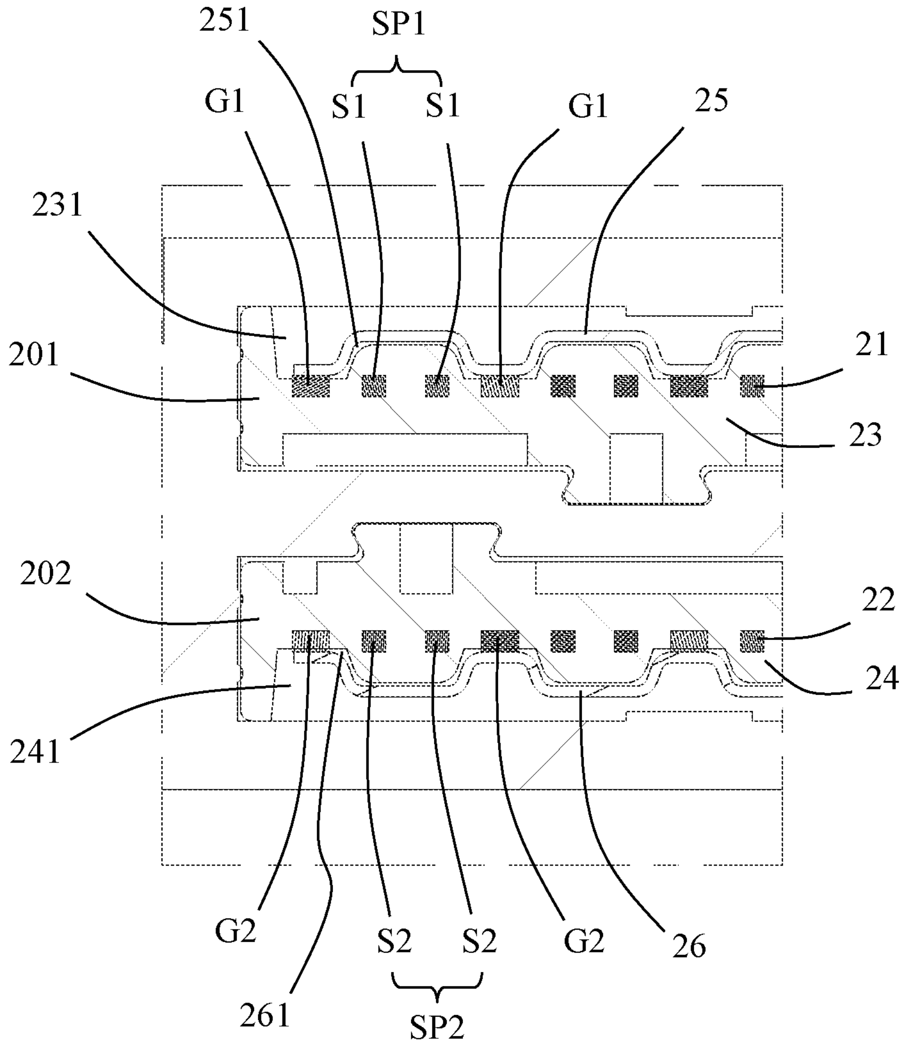
FIG. 17 is a partial enlarged view of a frame part D in FIG. 8.

Referring to FIG. 17, the plurality of first conductive terminals 21 include a plurality of first signal terminal pairs (Signal Pair, SP1) and a plurality of first ground terminals G1. The first ground terminals G1 are disposed on left and right sides of each first signal terminal pair SP1, respectively. Each first signal terminal pair SP1 includes two first signal terminals S1. The electrical connector 100 further includes a first ground connection piece 25 connecting the plurality of the first ground terminals G1 in series in order to improve the grounding shielding effect. The first ground connection piece 25 is provided with a plurality of first relief recesses 251 of which each corresponds to a corresponding first signal terminal pair SP1 to avoid short circuit due to contact with the first signal terminal pair SP1. The first conductive terminals 21 are correspondingly located in the first spacing grooves 141 to achieve positioning. The first conductive terminals 21 are at least partially exposed upwardly in the first hollow groove 140 to adjust impedance.

The plurality of second conductive terminals 22 include a plurality of second signal terminal pairs (Signal Pair, SP2) and a plurality of second ground terminals G2. The second ground terminals G2 are disposed on left and right sides of each second signal terminal pair SP2, respectively. Each second signal terminal pair SP2 includes two second signal terminals S2. The electrical connector 100 further includes a second ground connection piece 26 connecting the plurality of the second ground terminals G2 in series in order to improve the grounding shielding effect. The second ground connection piece 26 is provided with a plurality of second relief recesses 261 of which each corresponds to a corresponding second signal terminal pair SP2 to avoid short circuit due to contact with the second signal terminal pair SP2. The second conductive terminals 22 are correspondingly located in the second spacing grooves 151 to achieve positioning. The second conductive terminals 22 are at least partially exposed downwardly in the second hollow groove 150 to adjust impedance.

Figure 11:
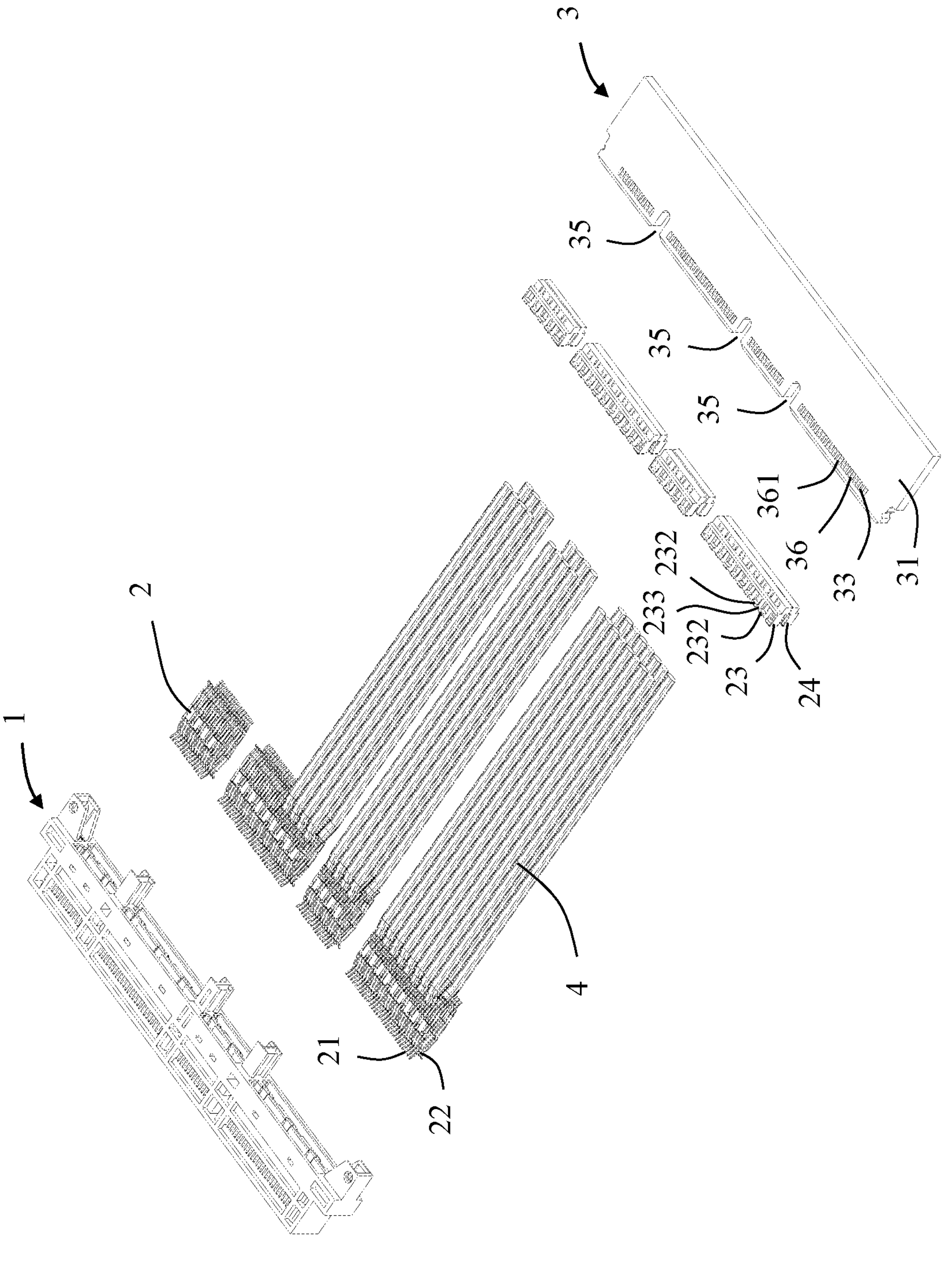
FIG. 11 is a partially exploded perspective view of FIG. 1.
Figure 12:
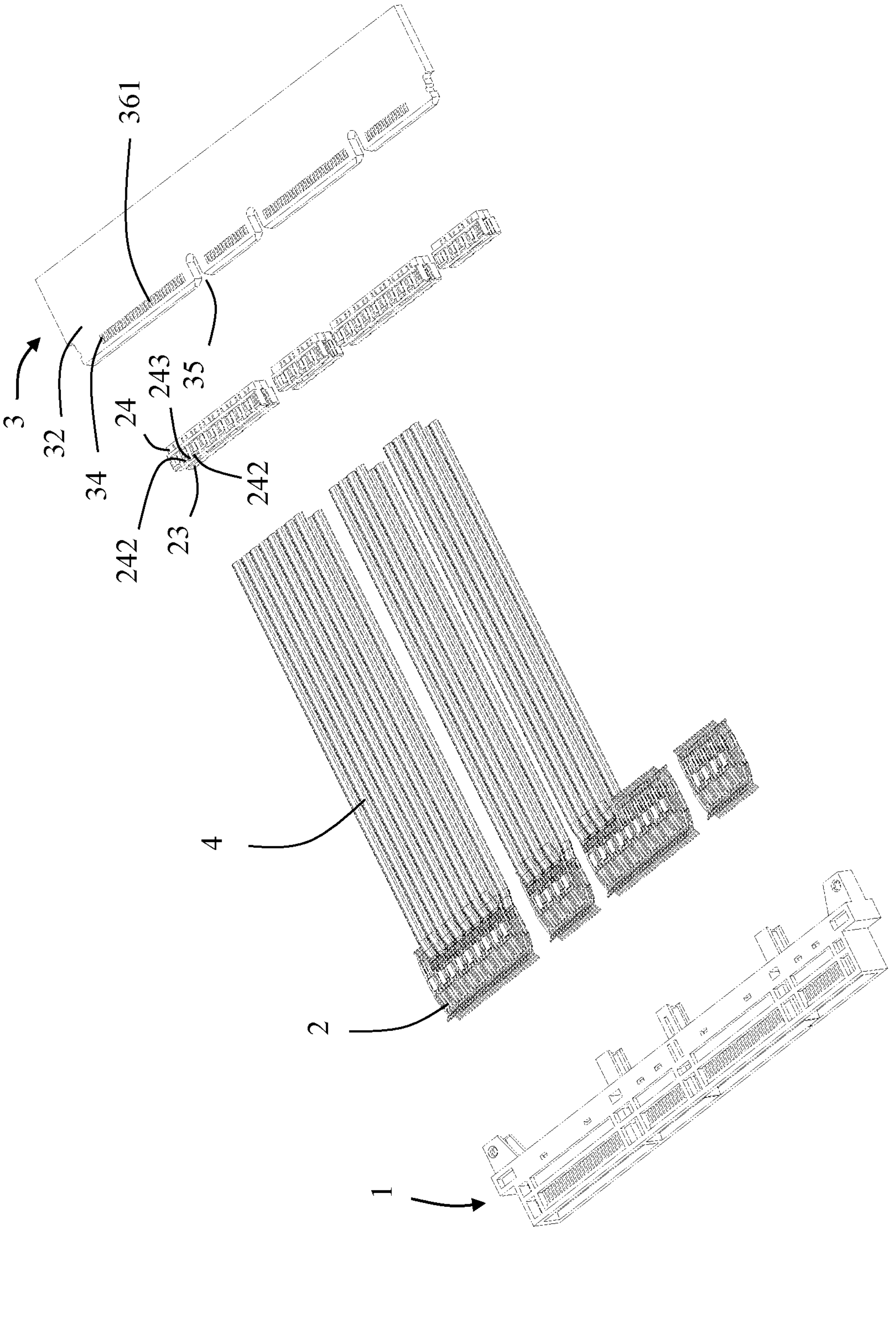
FIG. 12 is a partially exploded perspective view of FIG. 11 from another angle.

Referring to FIGS. 11, 12 and 17, the first insulating block 23 is provided with a first mounting groove 231 for mounting the first ground connection piece 25, a plurality of first protruding blocks 232, and a first positioning groove 233 located between two adjacent first protruding blocks 232. The first ground connection piece 25 includes a first protrusion 252 clamped in the first positioning groove 233.

The second insulating block 24 is provided with a second mounting groove 241 for mounting the second ground connection piece 26, a plurality of second protruding blocks 242, and a second positioning groove 243 located between two adjacent second protruding blocks 242. The second ground connection piece 26 includes a second protrusion 262 clamped in the second positioning groove 243.

Referring to FIG. 13, each first ground terminal G1 includes a first inclined arm 213 connected to the first mating portion 211 of the first ground terminal G1. Each first signal terminal S1 includes a second inclined arm 214 connected to the first mating portion 211 of the first signal terminal S1. A width of the first inclined arm 214 is greater than a width of the second inclined arm 214. In the illustrated embodiment of the present disclosure, the first inclined arm 213 is provided with a first slot 2131 to adjust impedance.

Similarly, each second ground terminal G2 includes a third inclined arm 223 connected to the second mating portion 221 of the second ground terminal G2. Each second signal terminal S2 includes a fourth inclined arm 224 connected to the second mating portion 221 of the second signal terminal S2. A width of the third inclined arm 223 is greater than a width of the fourth inclined arm 224. In the illustrated embodiment of the present disclosure, the third inclined arm 223 is provided with a second slot 2231 to adjust impedance.

Referring to FIGS. 3, 11 and 12, the adapter circuit board 3 is used to process signals and is connected to a main circuit board (not shown). The adapter circuit board 3 includes a first insertion portion 36. The first insertion portion 36 is provided with a plurality of first mating conductive pads 361. In the embodiment shown in the present disclosure, the first insertion portion 36 is an input port. The first insertion portion 36 of the adapter circuit board 3 includes a first surface 31, a second surface 32 disposed opposite to the first surface 31, a plurality of first conductive pads 33 exposed on the first surface 31, and a plurality of second conductive pads 34 exposed on the second surface 32. The plurality of first mating conductive pads 361 include the plurality of first conductive pads 33 and the plurality of second conductive pads 34. In addition, the adapter circuit board 3 further includes a positioning notch 35 for mating with the partition 16. The adapter circuit board 3 is mounted to the insulating body 1 along a rear-to-front direction. The adapter circuit board 3 is at least partially inserted into the positioning slot 130. The first rib 131 abuts against the second surface 32 of the adapter circuit board 3, and the second rib 132 abuts against the first surface 31 of the adapter circuit board 3, thereby preventing the adapter circuit board 3 from being loosened.

Figure 15:
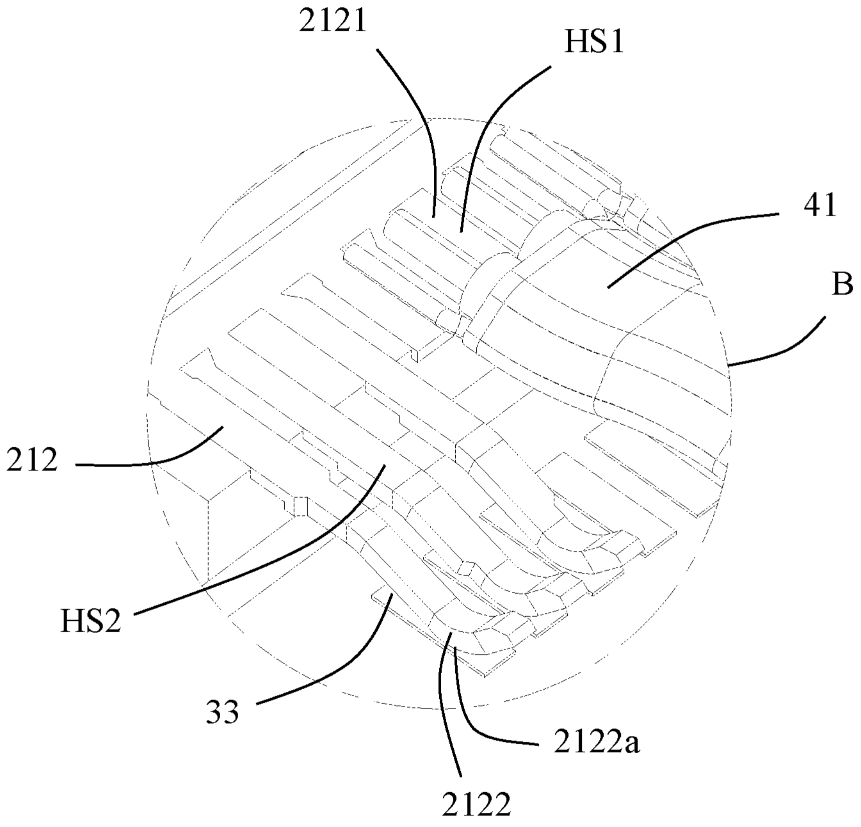
FIG. 15 is a partial enlarged view of a circled part B in FIG. 1.
Figure 16:
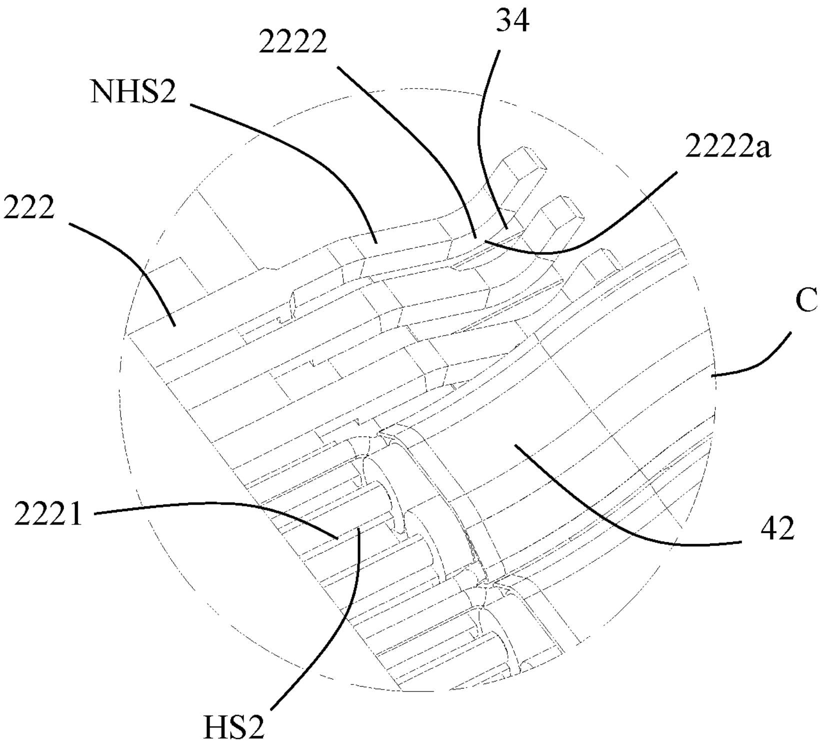
FIG. 16 is a partial enlarged view of a circled part C in FIG. 2.

In the illustrated embodiment of the present disclosure, the first connecting portions 2121, the second connecting portions 2221, the first elastic mounting arms 2122 and the second elastic mounting arms 2222 all extend backwardly beyond the rear end surface 12. When the adapter circuit board 3 is assembled in place, the adapter circuit board 3 is clamped between the first elastic mounting arms 2122 and the second elastic mounting arms 2222. Referring to FIGS. 15 and 16, in the illustrated embodiment of the present disclosure, the first elastic mounting arms 2122 and the second elastic mounting arms 2222 have first arc-shaped contact portions **2122*a* and second arc-shaped contact portions 2222*a*, respectively, so as to facilitate insertion of the adapter circuit board 3. The first arc-shaped contact portions 2122*a* of the first elastic mounting arms 2122 are electrically connected to the first conductive pads 33. The second arc-shaped contact portions 2222*a* of the second elastic mounting arms 2222 are electrically connected to the second conductive pads 34. In an embodiment of the present disclosure, the first arc-shaped contact portions 2122*a* of the first elastic mounting arms 2122 abut against the first conductive pads 33, and a soldering process may be omitted to save cost. Similarly, the second arc-shaped contact portions 2222*a* of the second elastic mounting arms 2222 are in contact with the second conductive pads 34, and a soldering process may be omitted to save cost. Of course, in other embodiments, the first elastic mounting arms 2122 and the first conductive pads 33 may be further fixed by soldering; and the second elastic mounting arms 2222 and the second conductive pads 34** may be further fixed by soldering, thereby improving the contact reliability thereof.

Referring to FIGS. 15 and 16, the plurality of cables 4 include a plurality of first cables 41 electrically connected to the first connecting portions 2121 and a plurality of second cables 42 electrically connected to the second connecting portions 2221. The first connecting portions 2121 are fixed to the first cables 41 by soldering, and the second connecting portions 2221 are fixed to the second cables 42 by soldering.

Compared with the prior art, the first high-speed signal terminals HS1 and the second high-speed signal terminals HS2 of the present disclosure are connected to the first cables 41 and the second cables 42, and are transmitted through cables, which reduces the signal distortion that may be caused when high-speed signals are transmitted through a circuit board, thereby improving the quality of signal transmission. At the same time, the first non-high-speed signal terminals NHS1 and the second non-high-speed signal terminals NHS2 are electrically connected to the adapter circuit board 3, which simplifies the circuit design of the adapter circuit board 3. The first conductive terminals 21 and the second conductive terminals 22 of the electrical connector 100 of the present disclosure are connected by a combination of the cables and the adapter circuit board 3, which facilitates better arrangement of the conductive terminals 2. This can not only adapt to the transmission of high-speed signal terminals and non-high-speed signal terminals, but also balance the design of the electrical connector 100 and save costs.

Referring to FIGS. 19 to 29 and FIGS. 31 to 33, the illustrated embodiment of the present disclosure also discloses a connector assembly, which includes the electrical connector 100 in a second embodiment and a mating connector 200 for mating with the electrical connector 100. The electrical connector 100 in the second embodiment of the present disclosure is similar in structure to the electrical connector 100 in the first embodiment, and only the main differences between the two will be described below. For a clearer understanding of the electrical connector 100 of the present disclosure, in the first embodiment and the second embodiment, the same reference numerals represent the same or similar elements. In order to make the description as concise as possible, if these elements are not described in detail in a certain embodiment, reference may be made to corresponding descriptions in other embodiments.

The electrical connector 100 in the second embodiment of the present disclosure includes an insulating body 1, a plurality of conductive terminals 2, an adapter circuit board 3, and a plurality of cables 4. The electrical connector 100 is adapted for mating with a mating element (e.g., an electronic card or a tongue plate of a mating connector corresponding to the electrical connector 100) to transmit data and access power.

Figure 19:
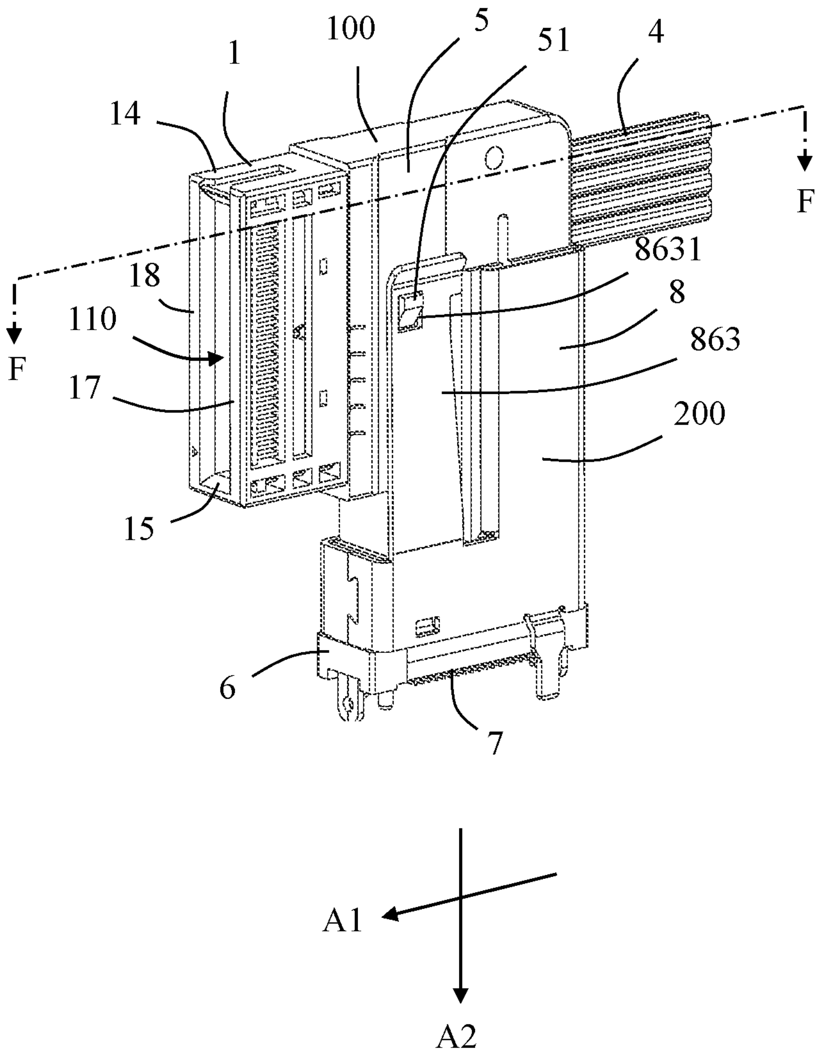
FIG. 19 is a schematic perspective view of a connector assembly in accordance with an embodiment of the present disclosure, wherein the electrical connector in a second embodiment of the present disclosure is inserted into a mating electrical connector.
Figure 20:
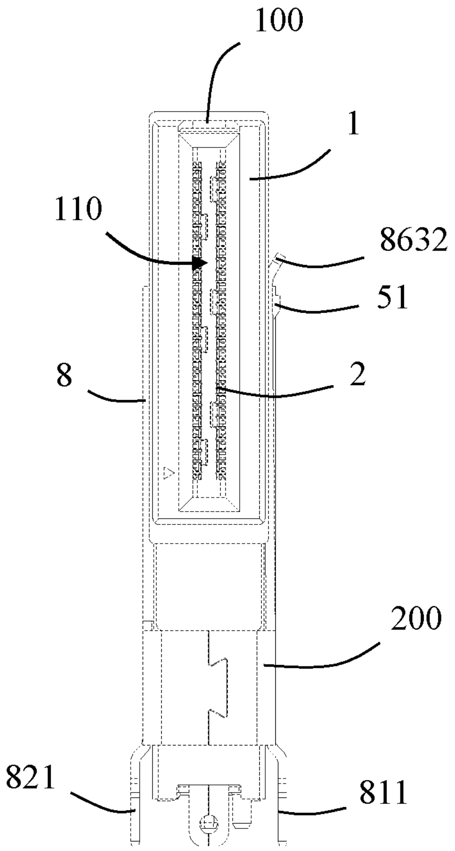
FIG. 20 is a front view of FIG. 19.
Figure 21:
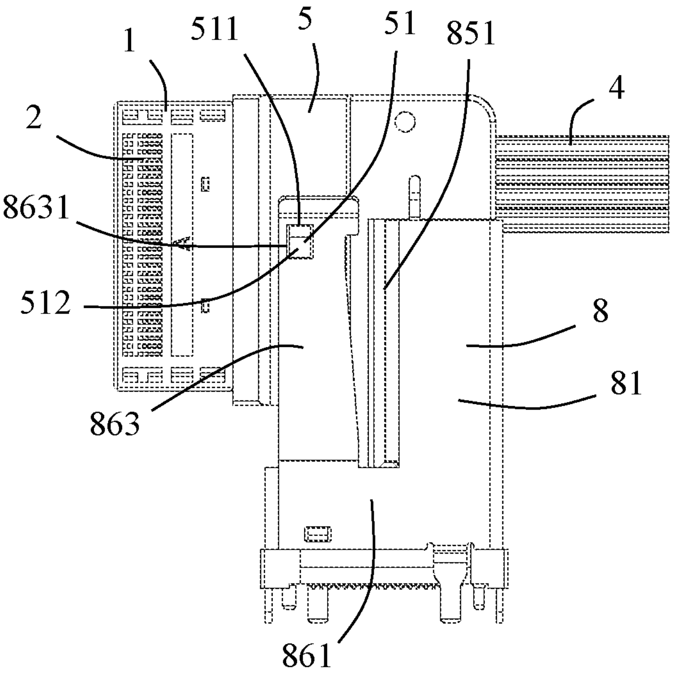
FIG. 21 is a right side view of FIG. 19.
Figure 22:
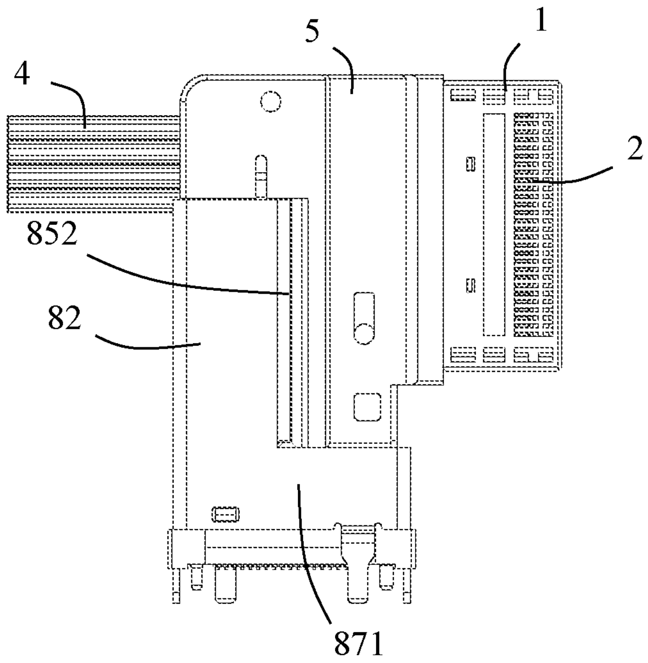
FIG. 22 is a left side view of FIG. 19.

Referring to FIG. 19, the insulating body 1 further includes a first side wall 17 (e.g., a right side wall) located on one side of the receiving slot 110 and a second side 18 (e.g., a left side wall) located on the other side of the receiving slot 110. The top wall 14 is connected to one end of the first side wall 17 and one end of the second side wall 18. The bottom wall 15 is connected to the other end of the first side wall 17 and the other end of the second side wall 18. The receiving slot 110 is jointly formed by the top wall 14, the bottom wall 15, the first side wall 17 and the second side wall 18.

Referring to FIG. 23 to FIG. 29, the adapter circuit board 3 includes a first insertion portion 36 and a second insertion portion 37. The first insertion portion 36 is an input port. The first insertion portion 36 includes a plug-in plate portion 360 and a plurality of first mating conductive pads 361 disposed on the plug-in plate portion 360. In the embodiment shown in the present disclosure, the plug-in plate portion 360 of the adapter circuit board 3 includes the first surface 31, a second surface 32 opposite to the first surface 31, a plurality of first conductive pads 33 exposed on the first surface 31, and a plurality of second conductive pads 34 exposed on the second surface 32. The plurality of first mating conductive pads 361 include the plurality of first conductive pads 33 and the plurality of second conductive pads 34.

The second insertion portion 37 is an output port. The second insertion portion 37 includes an insertion tongue 370 and a plurality of second mating conductive pads 371 disposed on the insertion tongue 370. In the illustrated embodiment of the present disclosure, an extending direction of the insertion tongue 370 and an extending direction of the plug plate portion 360 are perpendicular to each other. The plurality of second mating conductive pads 371 are configured to mate with the mating electrical connector 200. In the illustrated embodiment of the present disclosure, the plurality of second mating conductive pads 371 are located on two opposite surfaces of the insertion tongue 370.

Figure 30:
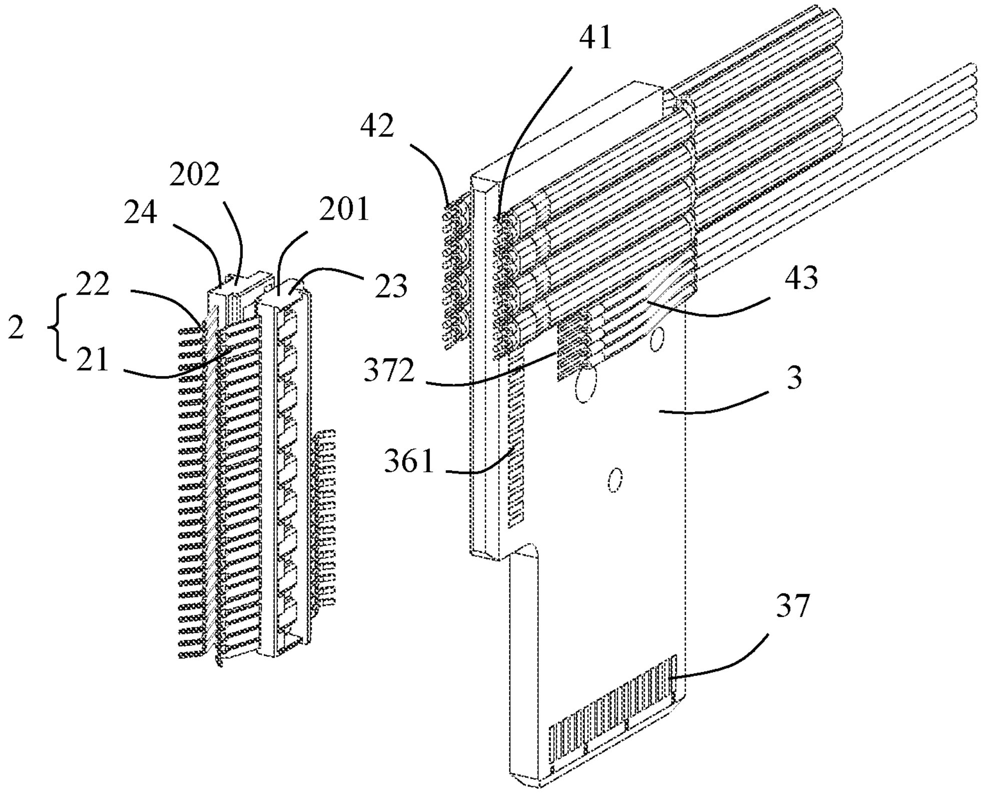
FIG. 30 is a partially exploded perspective view of an electrical connector in accordance with a third embodiment of the present disclosure, which shows a first terminal module, a second terminal module, a adapter circuit board and a plurality of cables, wherein the plurality of cables and the conductive terminals are separated from each other.
Figure 31:
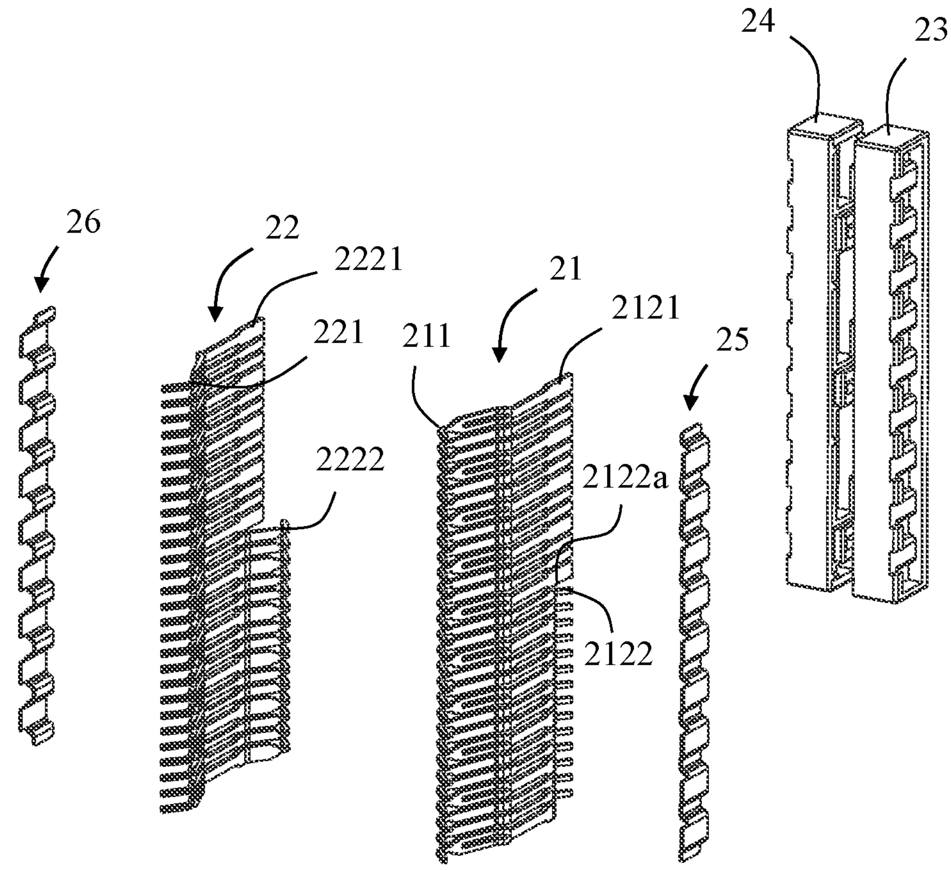
FIG. 31 is an exploded perspective view of the first terminal module and the second terminal module in FIG. 29.
Figure 32:
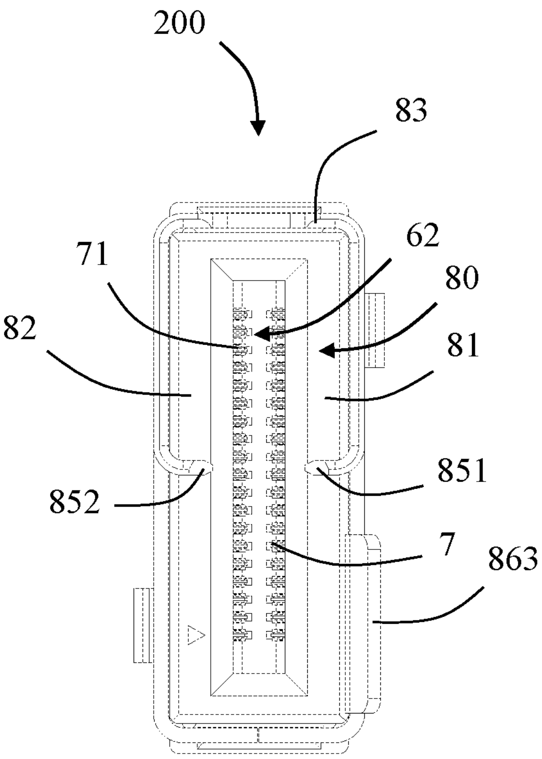
FIG. 32 is a top view of the mating electrical connector of FIG. 23.
Figure 33:
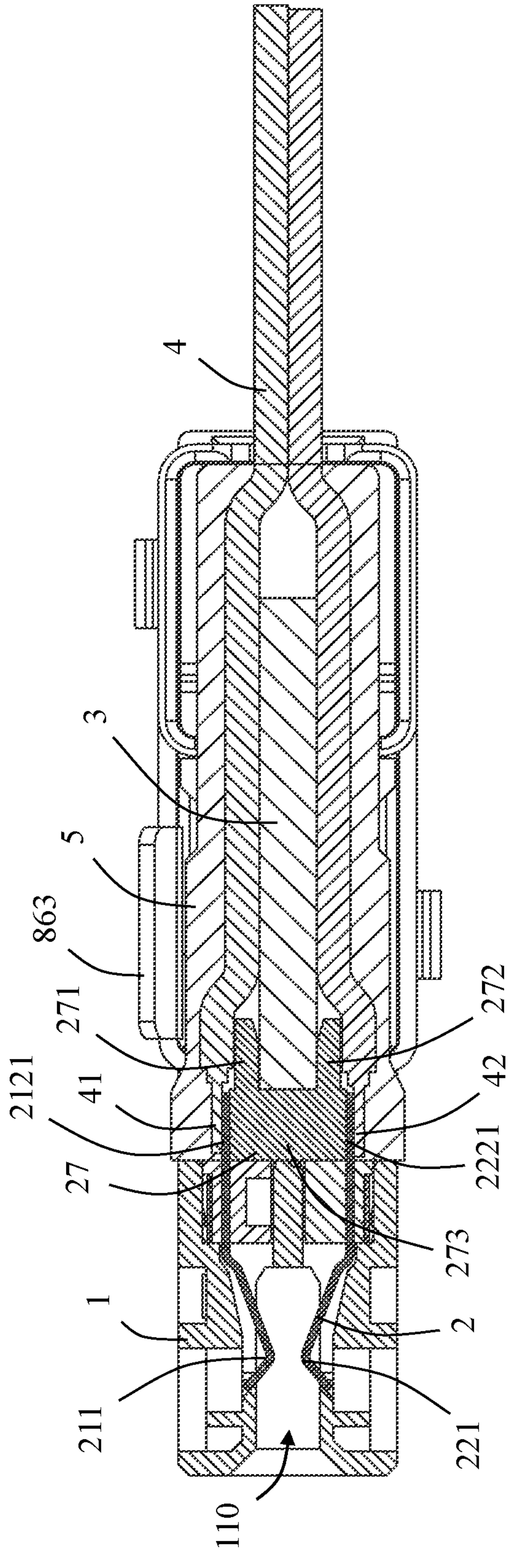
FIG. 33 is a schematic cross-sectional view taken along line F-F in FIG. 19.

Referring to FIG. 30, in an embodiment of the present disclosure, the adapter circuit board 3 further includes a plurality of third mating conductive pads 372. The cables 4 further include a plurality of third cables 43 fixed to the plurality of third mating conductive pads 372 (e.g., through soldering). In the embodiment shown in the present disclosure, the third mating conductive pads 372 and the third cables 43 are connected to transmit non-high-speed signals. At this time, the plurality of first mating conductive pads 361 serve as the conductive pads of the input port, the plurality of second mating conductive pads 371 serve as part of the conductive pads of the output port, and the plurality of third mating conductive pads 372 serve as another part of the conductive pads of the output port.

Referring to FIGS. 26 to 29 and FIG. 33, the electrical connector 100 in the second embodiment of the present disclosure further comprises a spacer 27. In the illustrated embodiment of the present disclosure, the spacer 27 is of a U-shaped configuration. The spacer 27 includes a first support plate 271, a second support plate 272 opposite to the first support plate 271, and a connection plate 273 connecting the first support plate 271 and the second support plate 272. The spacer 27 is assembled at rear ends of the first insulating block 23 and the second insulating block 24. The spacer 27 is sandwiched between the first connecting portions 2121 of the first high-speed signal terminals HS1 and the second connecting portions 2221 of the second high-speed signal terminals HS2. The first connecting portions 2121 of the first high-speed signal terminals HS1 are supported on the first support plate 271 so as to be in contact with the first cables 41 (e.g., through soldering). The second connecting portions 2221 of the second high-speed signal terminals HS2 are supported on the second support plate 272 so as to be in contact with the second cables 42 (e.g., through soldering). The present disclosure simplifies the first insulating block 23 by disposing the spacer 27 to support the first connecting portions 2121 of the first high-speed signal terminals HS1 and the second connecting portions 2221 of the second high-speed signal terminals HS2. As a result, the structural design of the first insulating block 23 and the second insulating block 24 is simplified, which is beneficial to reduce the manufacturing difficulty and save the cost. In addition, the first support plate 271, the second support plate 272 and the connection plate 273 jointly form a holding groove 270 for clamping the adapter circuit board 3, so as to facilitate installation with the adapter circuit board 3.

In the embodiment shown in the present disclosure, the first support plate 271 includes a first support surface 2711, a second support surface 2712, and a first abutting surface 2713 connecting the first support surface 2711 and the second support surface 2712. The first support surface 2711, the second support surface 2712 and the first abutting surface 2713 is of a stepped configuration. The second support surface 2712 is closer to a middle plane between the first support plate 271 and the second support plate 272 than the first support surface 2711. In other words, the second support surface 2712 is lower than the first support surface 2711. In this way, when the first cables 41 are assembled, the second support surface 2712 can provide a certain degree of space for the first cables 41. In addition, the first abutting surface 2713 can play a limiting function on the first cables 41.

Similarly, the second support plate 272 includes a third support surface 2721, a fourth support surface 2722, and a second abutting surface 2723 connecting the third support surface 2721 and the fourth support surface 2722. The third support surface 2721, the fourth support surface 2722 and the second abutting surface 2723 are of a stepped configuration. The fourth support surface 2722 is closer to the middle plane between the first support plate 271 and the second support plate 272 than the third support surface 2721. In other words, the fourth support surface 2722 is higher than the third support surface 2721. In this way, when the second cables 42 are assembled, the fourth support surface 2722 can provide a certain degree of space for the second cables 42. The second abutting surface 2723 can play a limiting function on the second cables 42.

Referring to FIG. 30, in a third embodiment of the electrical connector 100 of the present disclosure, the electrical connector 100 may not be provided with the spacer 27, but adopt a terminal fixing method similar to that in the electrical connector 100 of the first embodiment (referring to FIG. 15 and FIG. 16). That is, the first connecting portions 2121 of the first high-speed signal terminals HS1 are directly supported on the first insulating block 23 of the first terminal module 201, and the second connecting portions 2221 of the second high-speed signal terminals HS2 are directly supported on the second insulating block 24 of the second terminal module 202. With this arrangement, the first connecting portions 2121 of the first high-speed signal terminals HS1 and the second connecting portions 2221 of the second high-speed signal terminals HS2 can also be supported so that it is convenient to contact the first cables 41 and the second cables 42, respectively, which will not be repeated in the present disclosure.

Referring to FIG. 19 to FIG. 25 and FIG. 28, in the second embodiment of the present disclosure, the electrical connector 100 further includes an over-molding block 5 at least partially covering the insulating body 1, the plurality of conductive terminals, the adapter circuit board 3 and the plurality of cables 4. Portions where the plurality of first mating conductive pads 361 are in contact with the plurality of conductive terminals are located in the over-molding block 5. Portions where the first cables 41 are in contact with the first connecting portions 2121 and portions where the second cables 42 are in contact with the second connecting portions 2221 are also located in the over-molding block 5. With this arrangement, these contact portions can be fixed only by molding the over-molding block 5 once, which simplifies the manufacturing process and reduces the manufacturing difficulty. The plug-in tongue 370 protrudes beyond the over-molding block 5 to be inserted into the mating electrical connector 200. In addition, an outer side surface of the over-molding block 5 is provided with a locking protrusion 51. In the illustrated embodiment of the present disclosure, the locking protrusion 51 includes a locking surface 511 and an inclined guide surface 512.

Referring to FIG. 19 to FIG. 25, the present disclosure further discloses a connector assembly including the electrical connector 100 and the mating electrical connector 200 which are matched with each other. The mating electrical connector 200 is adapted to be mounted on a main circuit board (not shown).

Referring to FIGS. 19 to 25, FIG. 28 and FIG. 32, the mating electrical connector 200 includes a mating insulating body 6, a plurality of mating conductive terminals 7 fixed to the mating insulating body 6, and a metal shell 8 enclosing the mating insulating body 6. The mating insulating body 6 includes a mating surface 61 and a mating slot 62 extending through the mating surface 61. The insertion tongue 370 of the switch circuit board 3 are configured to be inserted into the mating slot 62 to achieve electrical connection with the mating electrical connector 200. Each mating conductive terminal 7 includes a contact portion 71 extending into the mating slot 62 and a mounting portion 72 for being fixed to the main circuit board. In an embodiment of the present disclosure, the mating conductive terminals 7 are disposed two rows. The two rows of mating conductive terminals 7 can provide a certain clamping force to the insertion tongue 370 of the adapter circuit board 3. Therefore, the insertion tongue 370 can be better maintained in the mating slot 62, and the mating reliability of the electrical connector 100 and the mating electrical connector 200 is improved. Of course, it is understandable to those skilled in the art that the aspect of the mating electrical connector 200 is not limited to the aspect shown in the figures. For example, the mating electrical connector 200 may not have the metal shell 8.

The metal shell 8 includes a first wall portion 81, a second wall portion 82 opposite to the first wall portion 81, a connecting portion 83 at least partially connecting the first wall portion 81 and the second wall portion 82, a buckle portion 84 for closing the metal shell 8, and a receiving cavity 80 located between the first wall portion 81 and the second wall portion 82. In an embodiment of the present disclosure, the metal shell 8 is formed by punching, bending and buckling a piece of metal sheet. Buckling structures (such as dovetail grooves and protrusions which cooperate with each other) are provided on the buckle portion 84. The buckle portion 84 and the connecting portion 83 are located on two sides of the receiving cavity 80, respectively. A height of the buckle portion 84 is lower than a height of the connecting portion 83. The first wall portion 81, the second wall portion 82, the connecting portion 83 and the buckle portion 84 encloses an outer wall of the mating insulating body 6, so that the mutual fixation of the metal shell 8 and the mating insulating body 6 is realized.

Specifically, the first wall portion 81 includes a first mounting foot 811 extending downwardly and toward a side away from the second wall portion 82. The second wall portion 82 includes a second mounting foot 821 extending downward and toward a side away from the first wall portion 81. The first mounting foot 811 and the second mounting foot 821 are adapted for being mounted on the main circuit board. In the embodiment shown in the present disclosure, in order to further enhance the structural strength, the heights of the first wall portion 81, the second wall portion 82 and the connecting portion 83 are set as high as possible. A height of the connecting portion 83 is the same as a height of the first wall portion 81 and a height of the second wall portion 82.

The metal shell 8 further includes a first tab 851 bent from the first wall portion 81 toward the second wall portion 82, and a second tab 852 bent from the second wall portion 82 toward the first wall portion 81. The metal shell 8 further includes a first extension portion 861 extending forwardly from the first wall portion 81, and an elastic locking arm 863 extending upwardly from the first extension portion 861. The metal shell 8 further includes a second extension portion 871 extending forwardly from the second wall portion 82.

Figure 23:
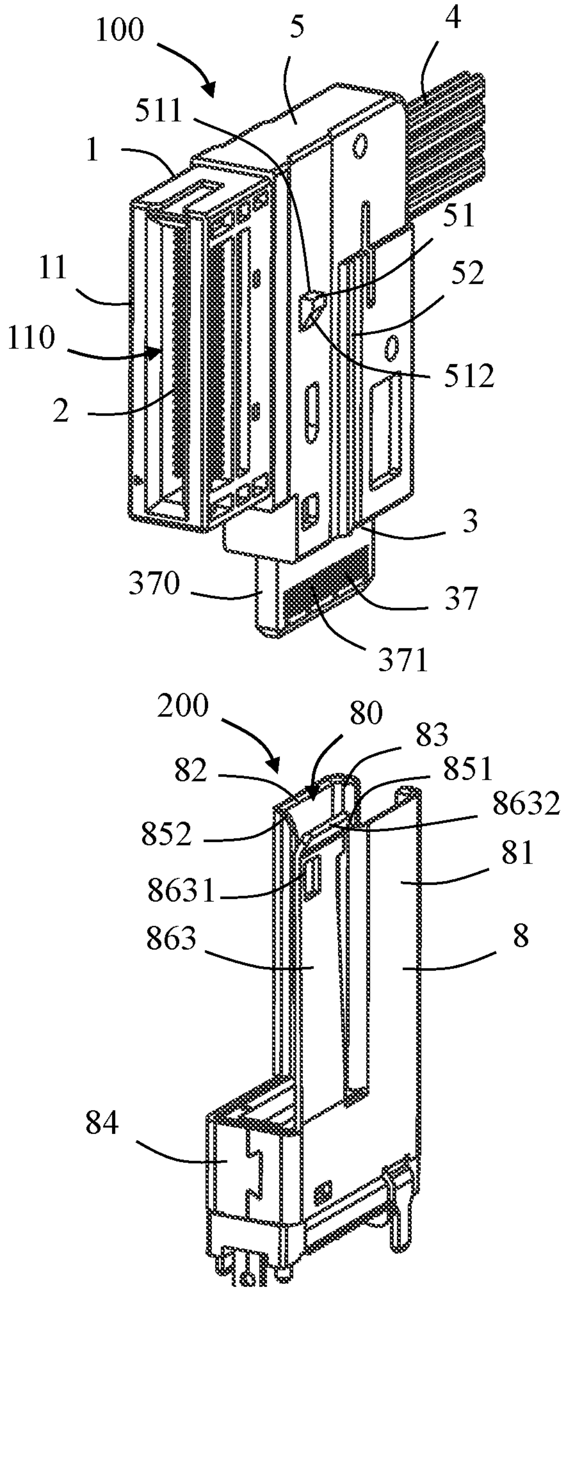
FIG. 23 is a partially exploded perspective view of FIG. 19, wherein the electrical connector in the second embodiment of the present disclosure is separated from the mating electrical connector.
Figure 24:
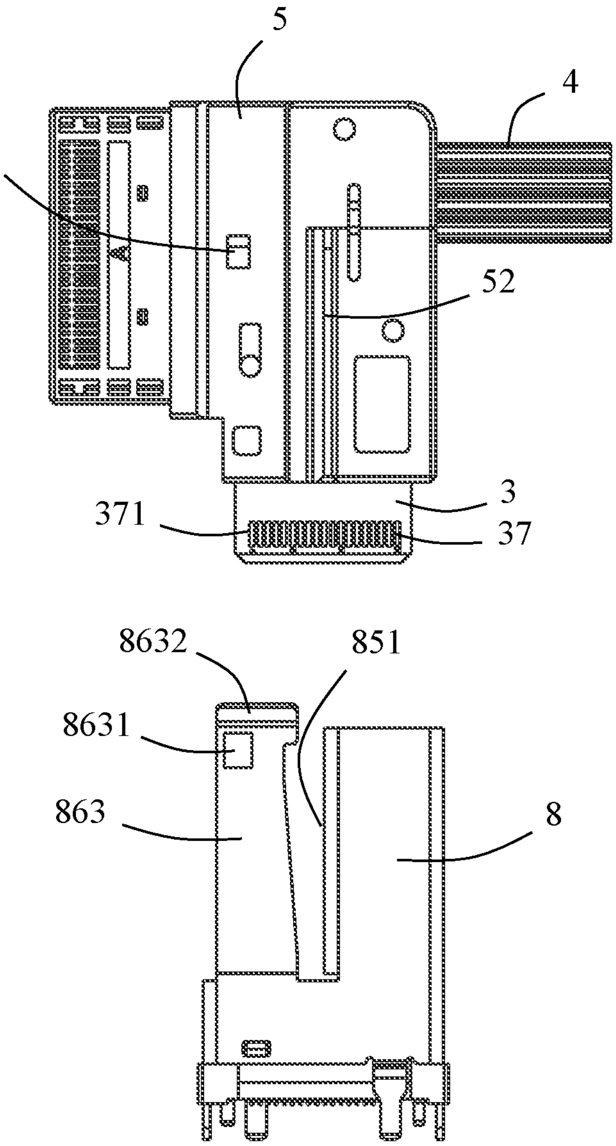
FIG. 24 is a right side view of FIG. 23.
Figure 25:
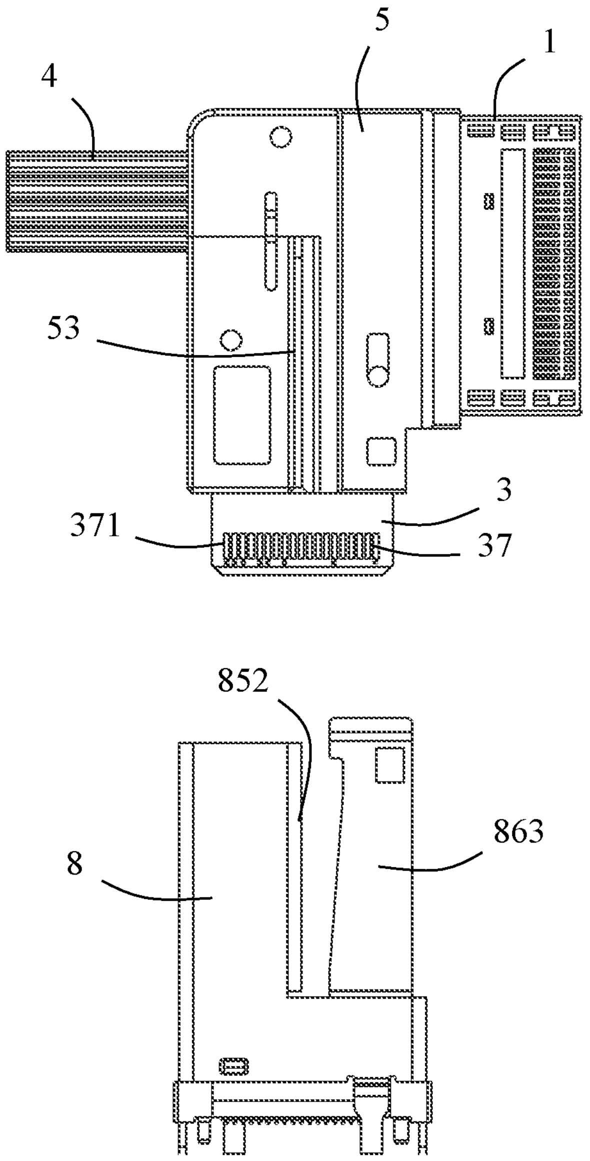
FIG. 25 is a left side view of FIG. 23.
Figure 26:
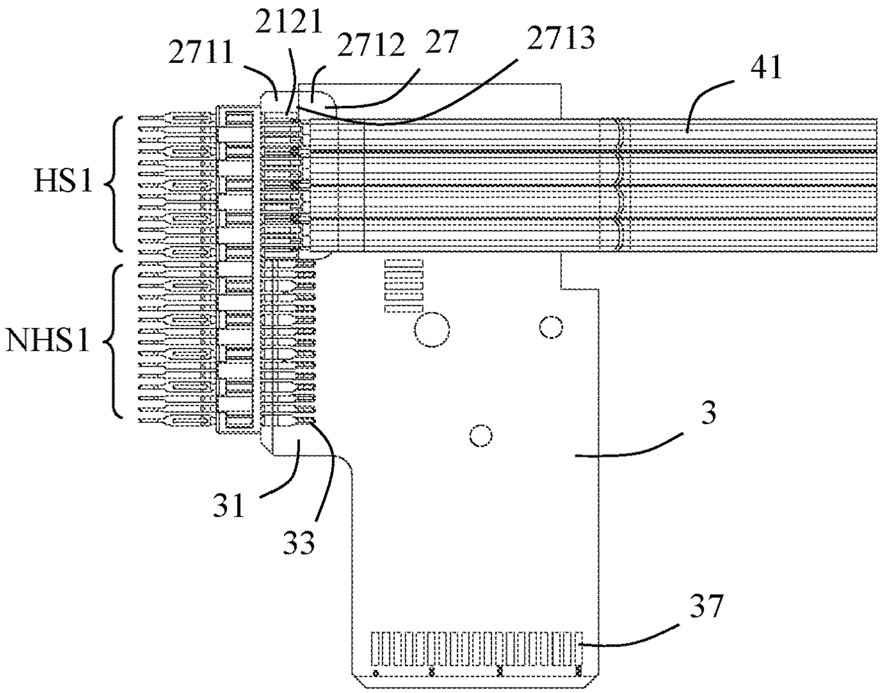
FIG. 26 is a right side view of a plurality of conductive terminals, a adapter circuit board, a spacer and a plurality of cables which are assembled together.
Figure 27:
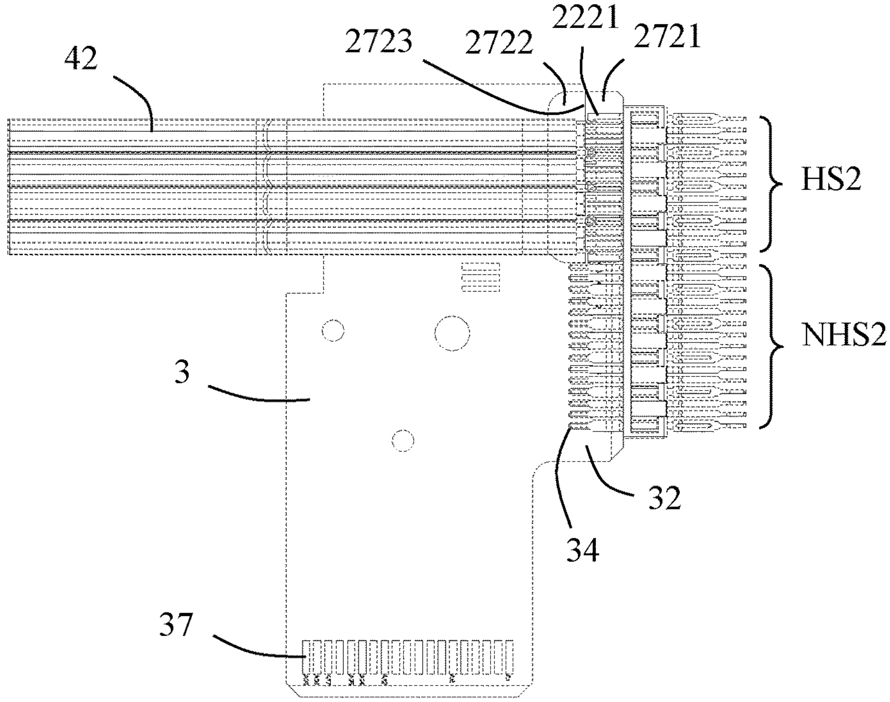
FIG. 27 is a left side view of FIG. 26.
Figure 28:
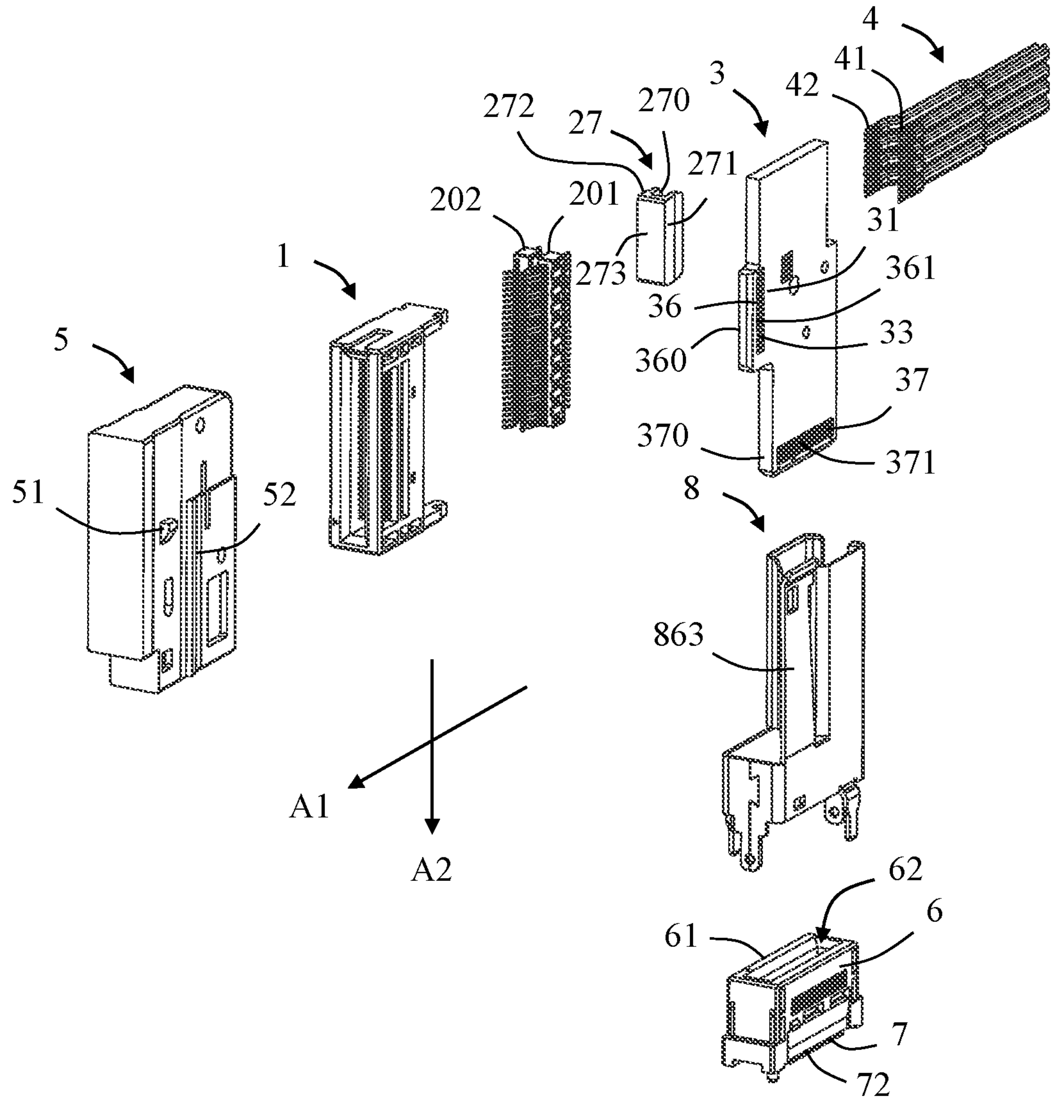
FIG. 28 is a partially exploded perspective view of FIG. 19.
Figure 29:
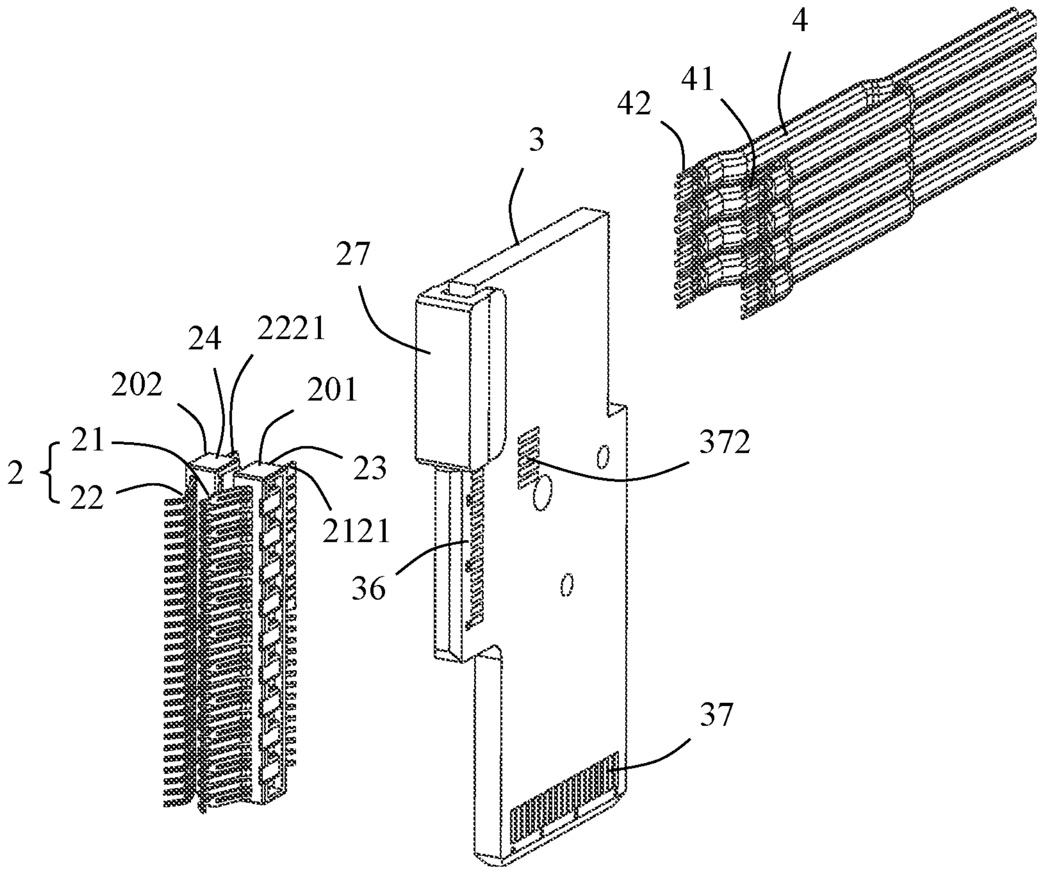
FIG. 29 is an exploded perspective view of a first terminal module, a second terminal module, the adapter circuit board, and the plurality of cables.

Referring to FIG. 23, in the embodiment shown in the present disclosure, the elastic locking arm 863 is of a cantilevered configuration. The elastic locking arm 863 includes a locking hole 8631 and an inclined portion 8632 at a free end (e.g., a top end). The inclined portion 8632 extends obliquely away from the second wall portion 82. The locking hole 8631 is close to the inclined portion 8632.

When the electrical connector 100 is mated with the mating electrical connector 200, the first tab 851 and the second tab 852 are locked in a first slit 52 and a second slit 53 of the over-molding block 5, respectively, so as to achieve better positioning. A relative position of the elastic locking arm 863 and the locking protrusion 51 changes along the guide surface 512 of the locking protrusion 51.

When the electrical connector 100 and the mating electrical connector 200 are mated in place, the elastic locking arm 863 release the elastic force, so that the locking protrusion 51 is locked in the locking hole 8631. A portion of the elastic locking arm 863 located on an upper edge of the locking hole 8631 can abut against the locking surface 511 in a vertical direction, so as to prevent the electrical connector 100 from being improperly separated from the mating electrical connector 200 in a direction opposite to an insertion direction. At this time, the insertion tongue 370 of the electrical connector 100 and part of the over-molding block 5 are accommodated in the mating electrical connector 200. The insertion tongue 370 is inserted into the mating slot 62 to achieve electrical connection with the mating conductive terminals 7.

When in use, the mating element (e.g., an electronic card) is inserted into the receiving slot 110, which exerts an insertion force on the electrical connector 100 in a direction opposite to a first direction A1. In the embodiment shown in the present disclosure, the first tab 851 and the second tab 852 are locked in the first slit 52 and the second slit 53 of the over-molding block 5, respectively. Therefore, the integrity of the connector assembly is improved, and the possible adverse effects of the insertion force on the connector assembly are reduced. In addition, by elevating the first wall portion 81, the second wall portion 82 and the connecting portion 83, the connecting portion 83 can better stop the electrical connector 100, thereby further reducing the possible adverse effects of the insertion force on the connector assembly. For example, the risk of loosening of the mating electrical connector 200 and the main circuit board at a soldering position caused by the insertion force is reduced, and the risk of poor contact between the second mating conductive pads 371 of the insertion tongue 370 and the mating conductive terminals 7 is reduced.

When unlocking is required, the inclined portion 8632 is pulled or pushed outwardly to make the locking protrusion 51 disengage from the locking hole 8631. Then, by applying a force opposite to a second direction A2, the electrical connector 100 can be pulled out from the mating electrical connector 200.

Compared with the prior art, the electrical connector 100 and the mating electrical connector 200 can prevent the electrical connector 100 from being disengaged in a direction opposite to the second direction A2 through interlocking structures. Thus, the mating reliability of the electrical connector 100 and the mating electrical connector 200 is improved. The interlocking structures include the elastic locking arm 863 and the locking protrusion 51 which cooperate with each other. Of course, it is understandable to those skilled in the art that, in order to improve the locking effect, the second side wall 18 may also be provided with a locking protrusion 51. Correspondingly, the metal shell 8 further includes an elastic locking arm 863 extending from the second wall portion 82.

In the illustrated embodiment of the present disclosure, the locking protrusion 51 is provided on the electrical connector 100, and the elastic locking arm 863 is provided on the mating electrical connector 200. Alternatively, the locking protrusion 51 can be provided on the mating electrical connector 200, the elastic locking arm 863 can be provided on the electrical connector 100, and the function of the interlocking structures can also be achieved.

The above embodiments are only used to illustrate the present disclosure and not to limit the technical solutions described in the present disclosure. The understanding of this specification should be based on those skilled in the art. Descriptions of directions, although they have been described in detail in the above-mentioned embodiments of the present disclosure, those skilled in the art should understand that modifications or equivalent substitutions can still be made to the application, and all technical solutions and improvements that do not depart from the spirit and scope of the application should be covered by the claims of the application.

What is claimed is:

1. An electrical connector, comprising:

an insulating body comprising a mating surface and a receiving slot extending through the mating surface;

a plurality of conductive terminals, each conductive terminal comprising a mating portion protruding into the receiving slot and a tail portion opposite to the mating portion, the plurality of conductive terminals comprising a plurality of first signal terminals and a plurality of second signal terminals, each tail portion of the first signal terminals comprising a connection portion;

an adapter circuit board comprising a first insertion portion and a second insertion portion, the first insertion portion comprising a plurality of first mating conductive pads, the plurality of first mating conductive pads being in contact with the tail portions of the plurality of second signal terminals, the second insertion portion comprising a plurality of second mating conductive pads, the plurality of second mating conductive pads being configured to mate with a mating electrical connector; and a plurality of cables which are in contact with the connection portions of the first signal terminals;

wherein the plurality of conductive terminals comprise a plurality of first conductive terminals and a plurality of second conductive terminals, the plurality of first conductive terminals comprise a plurality of first high-speed signal terminals and a plurality of first non-high-speed signal terminals;

wherein the plurality of second conductive terminals comprise a plurality of second high-speed signal terminals and a plurality of second non-high-speed signal terminals;

wherein the plurality of first signal terminals comprise the plurality of first high-speed signal terminals and the plurality of second high-speed signal terminals, the plurality of second signal terminals comprise the plurality of first non-high-speed signal terminals and the plurality of second non-high-speed signal terminals; and wherein the plurality of cables comprise a plurality of first cables electrically connected to the first high-speed signal terminals, and a plurality of second cables electrically connected to the second high-speed signal terminals.

2. The electrical connector according to claim 1, wherein each of the first conductive terminals comprises a first mating portion protruding into the receiving slot and a first tail portion opposite to the first mating portion, the first tail portion of the first high-speed signal terminal comprises a first connecting portion;

wherein each of the second conductive terminals comprises a second mating portion protruding into the receiving slot and a second tail portion opposite to the second mating portion, the second tail portion of the second high-speed signal terminal comprises a second connecting portion;

wherein the mating portion comprises the first mating portion and the second mating portion, the tail portion comprises the first tail portion and the second tail portion, the connection portion comprises the first connecting portion and the second connecting portion; and wherein the plurality of first cables are electrically connected to the first connecting portions of the first high-speed signal terminals, and the plurality of second cables are electrically connected to the second connecting portions of the second high-speed signal terminals.

3. The electrical connector according to claim 2, wherein the first mating portions of the first conductive terminals and the second mating portions of the second conductive terminals are located on opposite sides of the receiving slot, respectively;

wherein each first tail portion of the first non-high-speed signal terminals comprises a first elastic mounting arm, each second tail portion of the second non-high-speed signal terminals comprises a second elastic mounting arm; and wherein the adapter circuit board comprises a first surface and a second surface opposite to the first surface, the plurality of first mating conductive pads comprise a plurality of first conductive pads exposed to the first surface and a plurality of second conductive pads exposed to the second surface, the adapter circuit board is clamped between the first elastic mounting arms and the second elastic mounting arms, the first elastic mounting arms are in contact with the first conductive pads, and the second elastic mounting arms are in contact with the second conductive pads.

4. The electrical connector according to claim 3, wherein the first connecting portion is in a shape of a flat plate, the first elastic mounting arm extends beyond the first connecting portion in a direction away from the first mating portion, the first connecting portion is soldered to the first cable, the first elastic mounting arm comprises a first arc-shaped contact portion abutting against the first conductive pad; and wherein the second connecting portion is in a shape of a flat plate, the second elastic mounting arm extends beyond the second connecting portion in a direction away from the second mating portion, the second connecting portion is soldered to the second cable, the second elastic mounting arm comprises a second arc-shaped contact portion abutting against the second conductive pad.

5. The electrical connector according to claim 2, wherein the plurality of first conductive terminals comprise a plurality of first signal terminal pairs and a plurality of first ground terminals, the first ground terminals are located on left and right sides of each first signal terminal pair, respectively; the electrical connector further comprises a first ground connection piece which connects the plurality of the first ground terminals in series, the first ground connection piece comprises a plurality of first relief recesses, and each first relief recess corresponds to a corresponding first signal terminal pair; and wherein the plurality of second conductive terminals comprise a plurality of second signal terminal pairs and a plurality of second ground terminals, the second ground terminals are located on left and right sides of each second signal terminal pair, respectively; the electrical connector further comprises a second ground connection piece which connects the plurality of the second ground terminals in series, the second ground connection piece comprises a plurality of second relief recesses, and each second relief recess corresponds to a corresponding second signal terminal pair.

6. The electrical connector according to claim 5, further comprising a first terminal module and a second terminal module, the first terminal module comprising a first insulating block, the plurality of first conductive terminals being fixed to the first insulating block, the first insulating block defines a first mounting groove to mount the first ground connection piece;

wherein the second terminal module comprises a second insulating block, the plurality of second conductive terminals are fixed to the second insulating block, and the second insulating block defines a second mounting groove to mount the second ground connection piece.

7. The electrical connector according to claim 6, further comprising a spacer located at least partially between the first insulating block and the second insulating block, the spacer comprising a first support plate and a second support plate opposite to the first support plate, the first connecting portions are supported on the first support plate, and the second connecting portions are supported on the second support plate.

8. The electrical connector according to claim 7, wherein the spacer is of a U-shaped configuration, the spacer further comprises a connection plate connecting the first support plate and the second support plate; and wherein the first support plate, the second support plate and the connection plate jointly form a holding groove to clamp the adapter circuit board.

9. The electrical connector according to claim 1, wherein the second insertion portion of the adapter circuit board is provided with an insertion tongue, the plurality of second mating conductive pads are located on two opposite surfaces of the insertion tongue, and the insertion tongue is configured to be inserted into the mating electrical connector.

10. An electrical connector, comprising:

an insulating body comprising a mating surface and a receiving slot extending through the mating surface;

a plurality of conductive terminals, each conductive terminal comprising a mating portion protruding into the receiving slot and a tail portion opposite to the mating portion, the plurality of conductive terminals comprising a plurality of first signal terminals and a plurality of second signal terminals, each tail portion of the first signal terminals comprising a connection portion;

an adapter circuit board comprising a first insertion portion and a second insertion portion, the first insertion portion comprising a plurality of first mating conductive pads, the plurality of first mating conductive pads being in contact with the tail portions of the plurality of second signal terminals, the second insertion portion comprising a plurality of second mating conductive pads, the plurality of second mating conductive pads being configured to mate with a mating electrical connector; and a plurality of cables which are in contact with the connection portions of the first signal terminals;

wherein the second insertion portion of the adapter circuit board is provided with an insertion tongue, the plurality of second mating conductive pads are located on two opposite surfaces of the insertion tongue, and the insertion tongue is configured to be inserted into the mating electrical connector;

wherein the electrical connector further comprises an over-molding block at least partially covering the insulating body, the plurality of conductive terminals, the adapter circuit board and the plurality of cables; the plurality of first mating conductive pads are in contact with the tail portions of the plurality of second signal terminals at first portions which are located in the over-molding block; the plurality of cables are in contact with the connection portions of the first signal terminals at second portions which are located in the over-molding block; and the insertion tongue protrudes beyond the over-molding block.

11. A connector assembly, comprising: an electrical connector and a mating electrical connector which are mated with each other, the electrical connector comprising:

an insulating body comprising a mating surface and a receiving slot extending through the mating surface;

a plurality of conductive terminals, each conductive terminal comprising a mating portion protruding into the receiving slot and a tail portion opposite to the mating portion, the plurality of conductive terminals comprising a plurality of first signal terminals and a plurality of second signal terminals, each tail portion of the first signal terminals comprising a connection portion;

an adapter circuit board comprising a first insertion portion and a second insertion portion, the first insertion portion comprising a plurality of first mating conductive pads, the plurality of first mating conductive pads being in contact with the tail portions of the plurality of second signal terminals, the second insertion portion comprising a plurality of second mating conductive pads, the plurality of second mating conductive pads being configured to mate with the mating electrical connector; and a plurality of cables which are in contact with the connection portions of the first signal terminals;

the mating electrical connector comprising:

a mating insulating body comprising a mating surface and a mating slot extending through the mating surface, the adapter circuit board being at least partially inserted into the mating slot; and a plurality of mating conductive terminals, each mating conductive terminal comprising a contact portion extending into the mating slot, the contact portions of the plurality of mating conductive terminals being in electrical contact with the adapter circuit board;

wherein the electrical connector and the mating electrical connector further comprise interlocking structures to prevent the electrical connector from being detached from the mating electrical connector;

wherein the mating electrical connector comprises a metal shell surrounding the mating insulating body, the metal shell comprises a first wall portion, a second wall portion opposite to the first wall portion, a connecting portion connecting the first wall portion and the second wall portion, and a receiving cavity located between the first wall portion and the second wall portion; and wherein the receiving cavity communicates with the mating slot to accommodate at least part of the electrical connector.

12. The connector assembly according to claim 11, wherein the interlocking structures comprise an elastic locking arm and a locking protrusion, the elastic locking arm comprises a locking hole, and the locking protrusion is locked in the locking hole.

13. The connector assembly according to claim 12, wherein the elastic locking arm comprises an inclined portion at a free end thereof, and the inclined portion is configured to apply an external force to make the locking protrusion disengage from the locking hole.

14. The connector assembly according to claim 11, wherein the locking structures comprise an elastic locking arm provided on the metal shell and a locking protrusion provided on the electrical connector, and the elastic locking arm is lockable with the locking protrusion.

15. The connector assembly according to claim 11, wherein the plurality of conductive terminals comprise a plurality of first conductive terminals and a plurality of second conductive terminals, each of the first conductive terminals comprises a first mating portion protruding into the receiving slot and a first tail portion opposite to the first mating portion, the plurality of first conductive terminals comprise a plurality of first high-speed signal terminals and a plurality of first non-high-speed signal terminals, the first tail portion of the first high-speed signal terminal comprises a first connecting portion;

wherein each of the second conductive terminals comprises a second mating portion protruding into the receiving slot and a second tail portion opposite to the second mating portion, the plurality of second conductive terminals comprise a plurality of second high-speed signal terminals and a plurality of second non-high-speed signal terminals, the second tail portion of the second high-speed signal terminal comprises a second connecting portion;

wherein the plurality of first signal terminals comprise the plurality of first high-speed signal terminals and the plurality of second high-speed signal terminals, the plurality of second signal terminals comprise the plurality of first non-high-speed signal terminals and the plurality of second non-high-speed signal terminals, the mating portion comprises the first mating portion and the second mating portion, the tail portion comprises the first tail portion and the second tail portion, the connection portion comprises the first connecting portion and the second connecting portion; and wherein the plurality of cables comprise a plurality of first cables electrically connected to the first connecting portions of the first high-speed signal terminals, and a plurality of second cables electrically connected to the second connecting portions of the second high-speed signal terminals.

16. The connector assembly according to claim 15, wherein the first mating portions of the first conductive terminals and the second mating portions of the second conductive terminals are located on opposite sides of the receiving slot, respectively;

wherein each first tail portion of the first non-high-speed signal terminals comprises a first elastic mounting arm, each second tail portion of the second non-high-speed signal terminals comprises a second elastic mounting arm; and wherein the adapter circuit board comprises a first surface and a second surface opposite to the first surface, the plurality of first mating conductive pads comprise a plurality of first conductive pads exposed to the first surface and a plurality of second conductive pads exposed to the second surface, the adapter circuit board is clamped between the first elastic mounting arms and the second elastic mounting arms, the first elastic mounting arms are in contact with the first conductive pads, and the second elastic mounting arms are in contact with the second conductive pads.

17. The connector assembly according to claim 16, wherein the first connecting portion is in a shape of a flat plate, the first elastic mounting arm extends beyond the first connecting portion in a direction away from the first mating portion, the first connecting portion is soldered to the first cable, the first elastic mounting arm comprises a first arc-shaped contact portion abutting against the first conductive pad; and wherein the second connecting portion is in a shape of a flat plate, the second elastic mounting arm extends beyond the second connecting portion in a direction away from the second mating portion, the second connecting portion is soldered to the second cable, the second elastic mounting arm comprises a second arc-shaped contact portion abutting against the second conductive pad.

18. The connector assembly according to claim 15, wherein the plurality of first conductive terminals comprise a plurality of first signal terminal pairs and a plurality of first ground terminals, the first ground terminals are located on left and right sides of each first signal terminal pair, respectively; the electrical connector further comprises a first ground connection piece which connects the plurality of the first ground terminals in series, the first ground connection piece comprises a plurality of first relief recesses, and each first relief recess corresponds to a corresponding first signal terminal pair; and wherein the plurality of second conductive terminals comprise a plurality of second signal terminal pairs and a plurality of second ground terminals, the second ground terminals are located on left and right sides of each second signal terminal pair, respectively; the electrical connector further comprises a second ground connection piece which connects the plurality of the second ground terminals in series, the second ground connection piece comprises a plurality of second relief recesses, and each second relief recess corresponds to a corresponding second signal terminal pair.

19. The connector assembly according to claim 11, wherein the second insertion portion of the adapter circuit board is provided with an insertion tongue, the plurality of second mating conductive pads are located on two opposite surfaces of the insertion tongue, and the insertion tongue is configured to be inserted into the mating electrical connector.

* * * * *